Dec. 22, 1959 L. M. LLORENS 2,918,212
CALCULATING MACHINE
Filed July 29, 1950 10 Sheets-Sheet 1

FRONT END

INVENTOR.
Louis M. Llorens
BY
Dale A. Bauer
ATTORNEY.

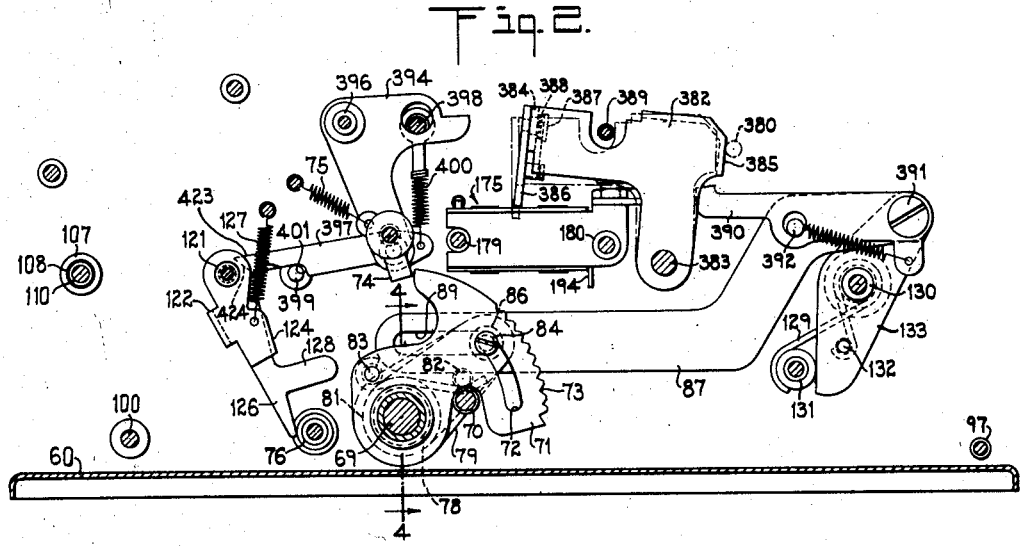

Dec. 22, 1959                L. M. LLORENS                2,918,212
                           CALCULATING MACHINE
Filed July 29, 1950                                    10 Sheets-Sheet 3
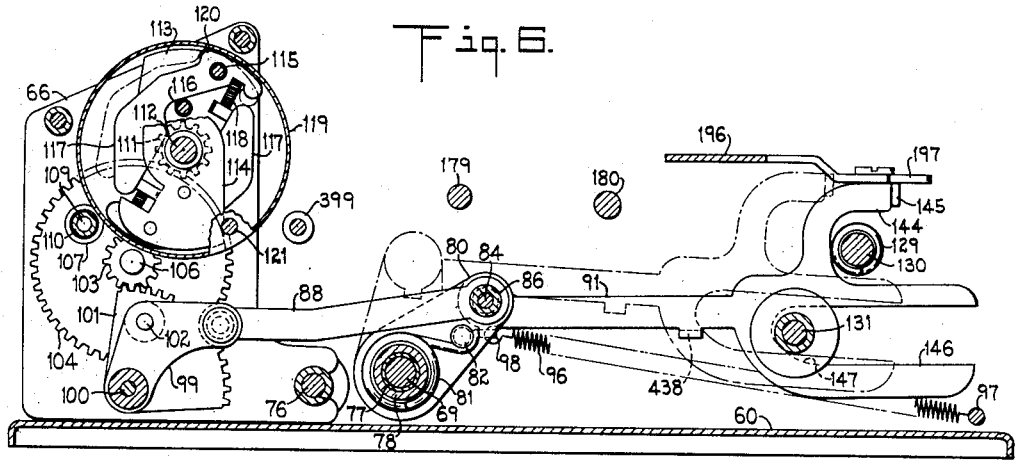
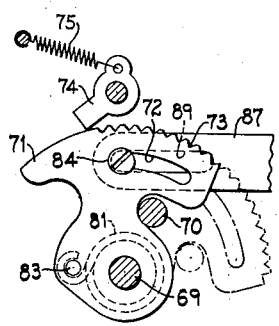
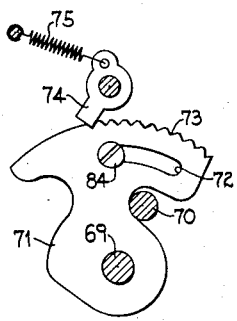
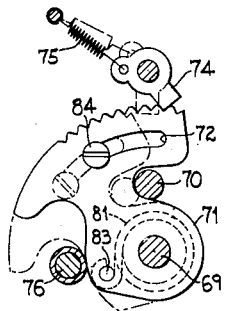
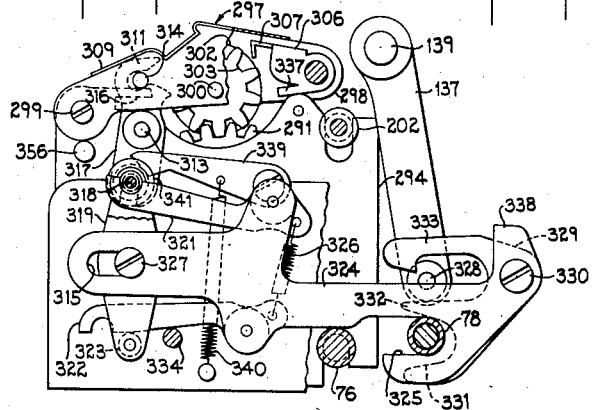
INVENTOR.
Louis M. Llorens
BY
Dale A. Bauer
ATTORNEY.

Dec. 22, 1959   L. M. LLORENS   2,918,212
CALCULATING MACHINE
Filed July 29, 1950   10 Sheets-Sheet 4
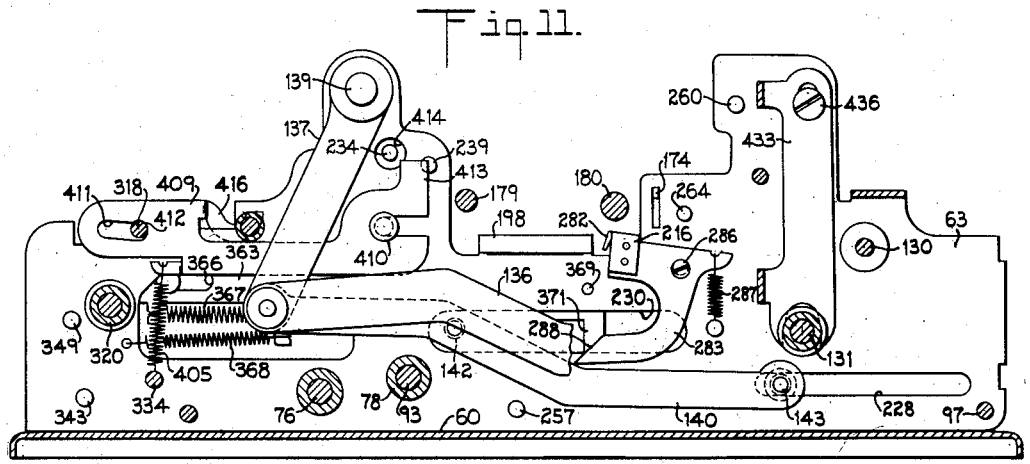
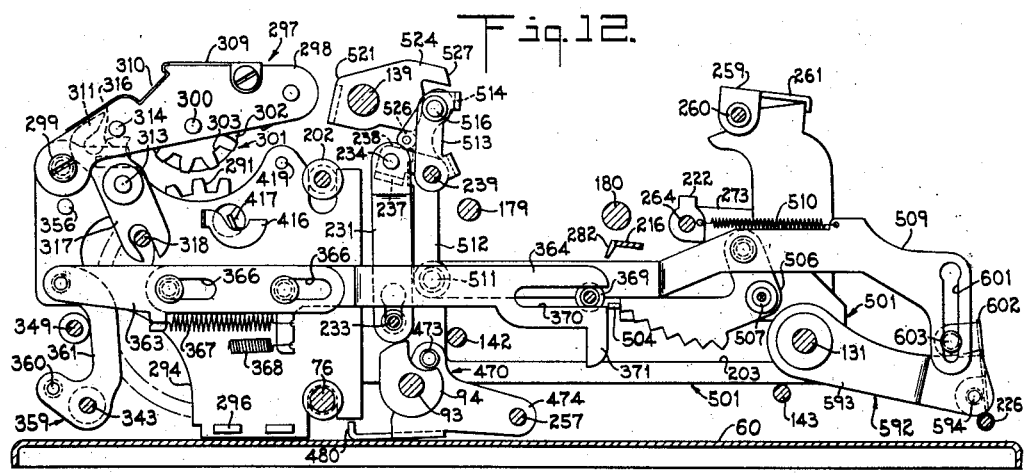
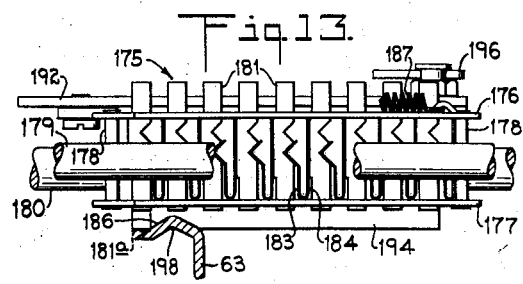
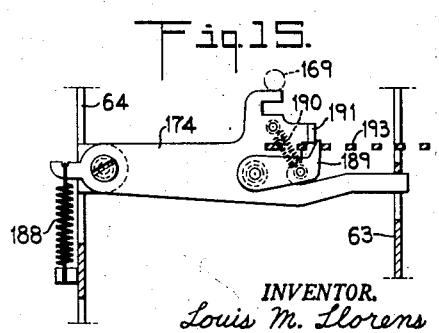
INVENTOR.
Louis M. Llorens
BY
Dale A. Bauer
ATTORNEY.

Dec. 22, 1959 L. M. LLORENS 2,918,212
CALCULATING MACHINE
Filed July 29, 1950 10 Sheets-Sheet 5
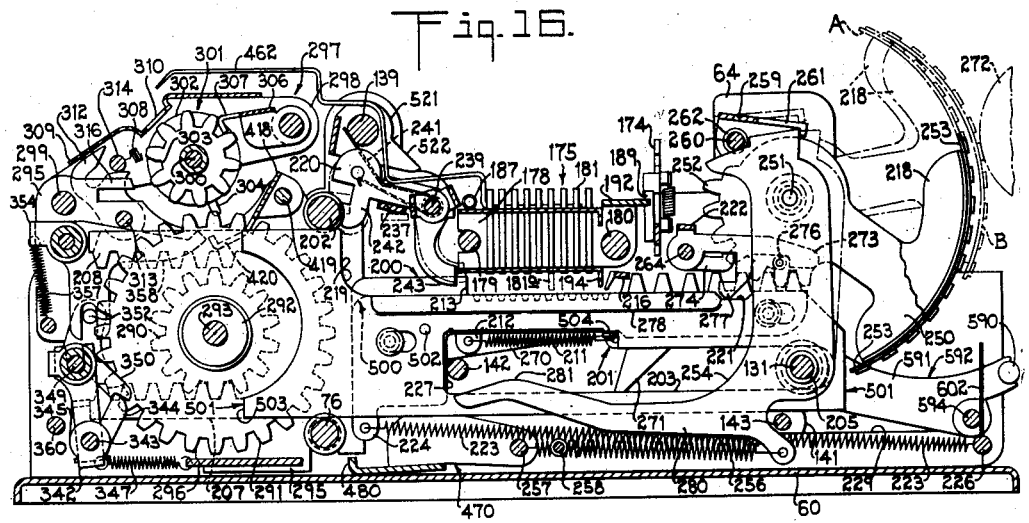
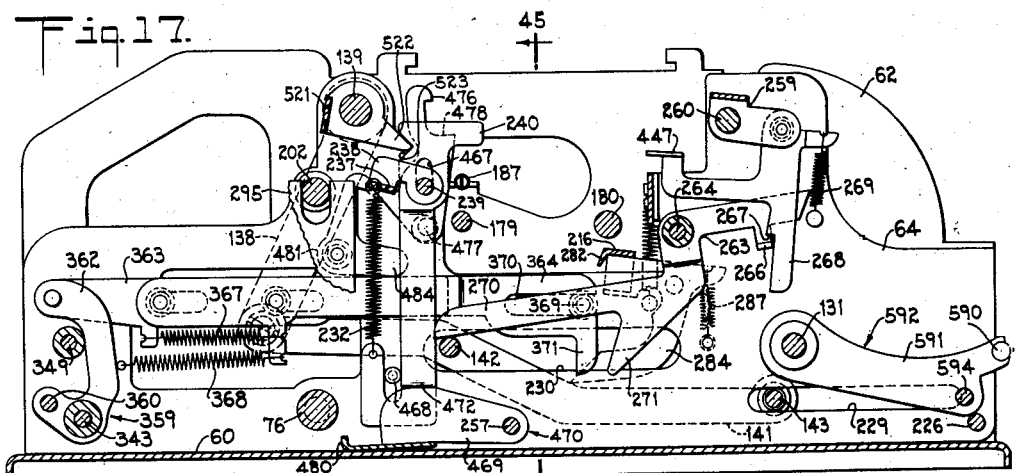
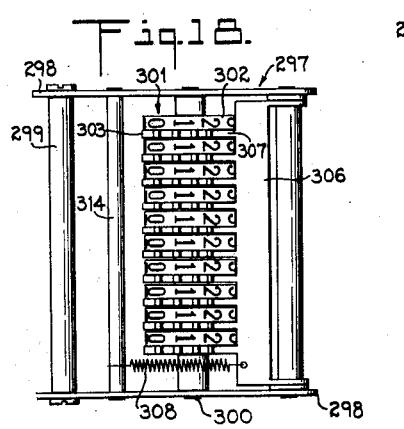
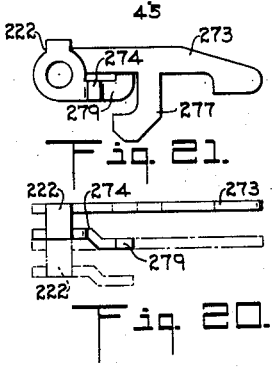
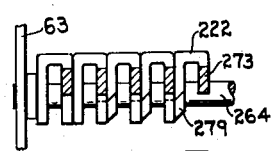
INVENTOR.
Louis M. Llorens
BY
Dale A. Bauer
ATTORNEY.

Dec. 22, 1959  L. M. LLORENS  2,918,212
CALCULATING MACHINE
Filed July 29, 1950  10 Sheets-Sheet 6
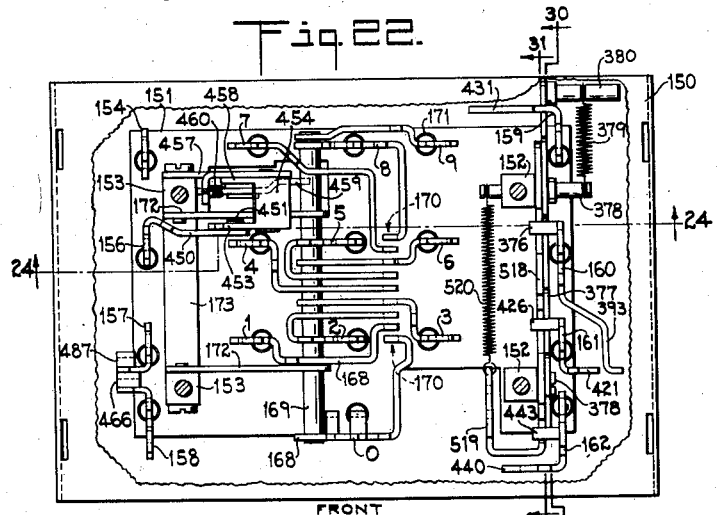
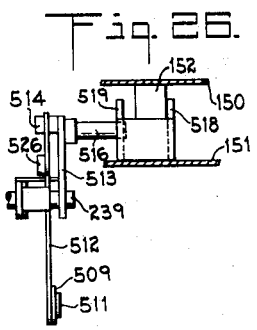
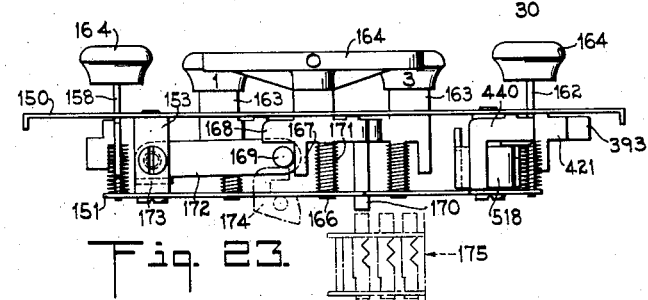
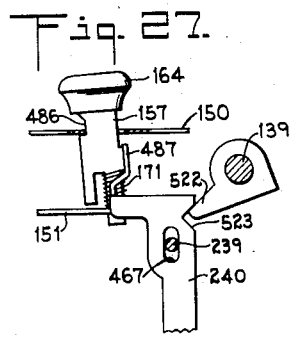
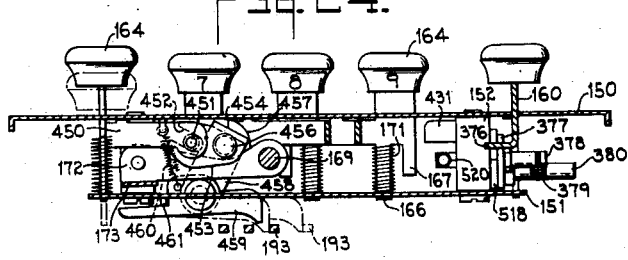
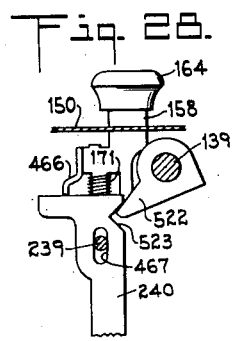
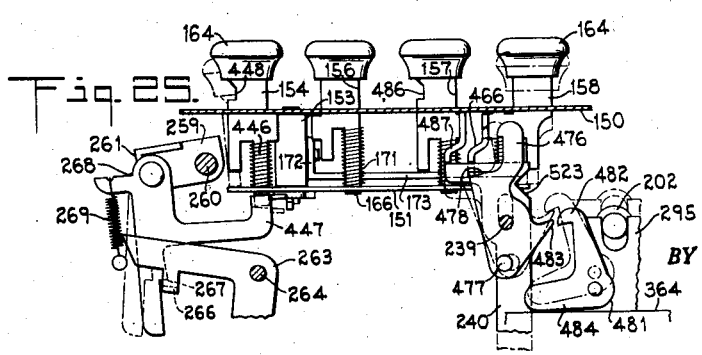
INVENTOR.
Louis M. Llorens
BY
Dale A. Bauer
ATTORNEY.

Dec. 22, 1959  L. M. LLORENS  2,918,212
CALCULATING MACHINE
Filed July 29, 1950   10 Sheets-Sheet 7
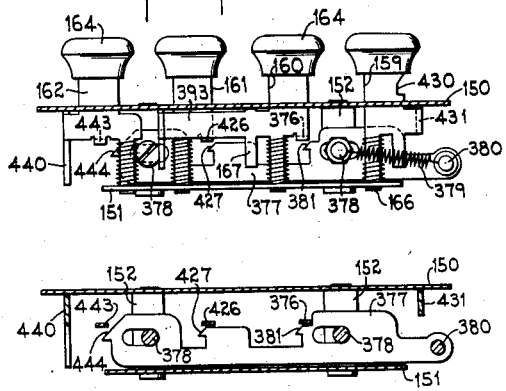
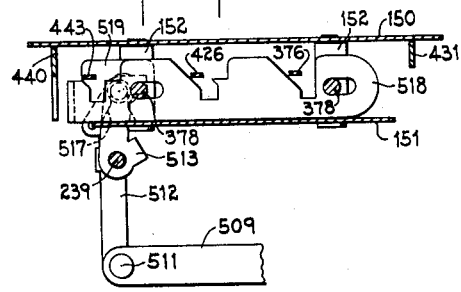
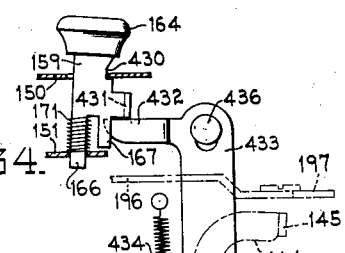
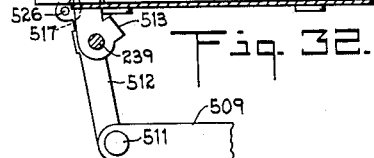
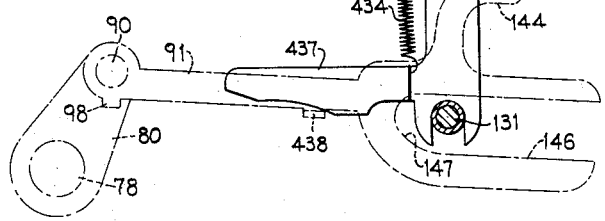
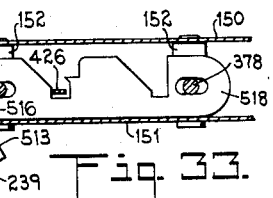
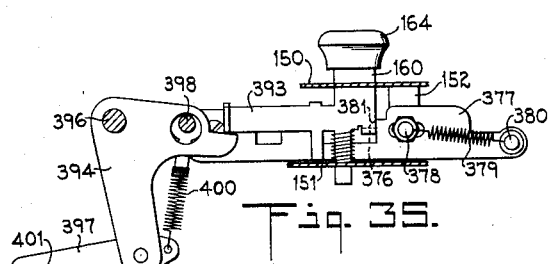
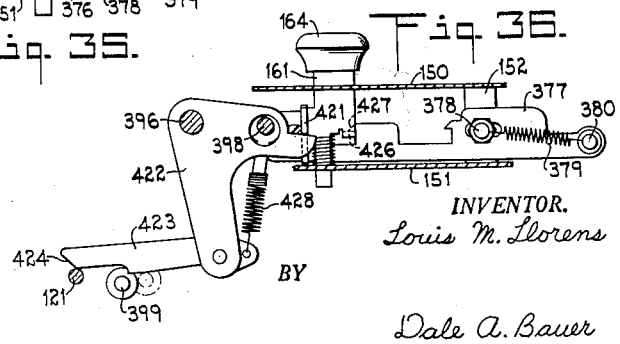
INVENTOR.
Louis M. Llorens
BY
Dale A. Bauer
ATTORNEY.

Dec. 22, 1959  L. M. LLORENS  2,918,212
CALCULATING MACHINE
Filed July 29, 1950  10 Sheets-Sheet 8
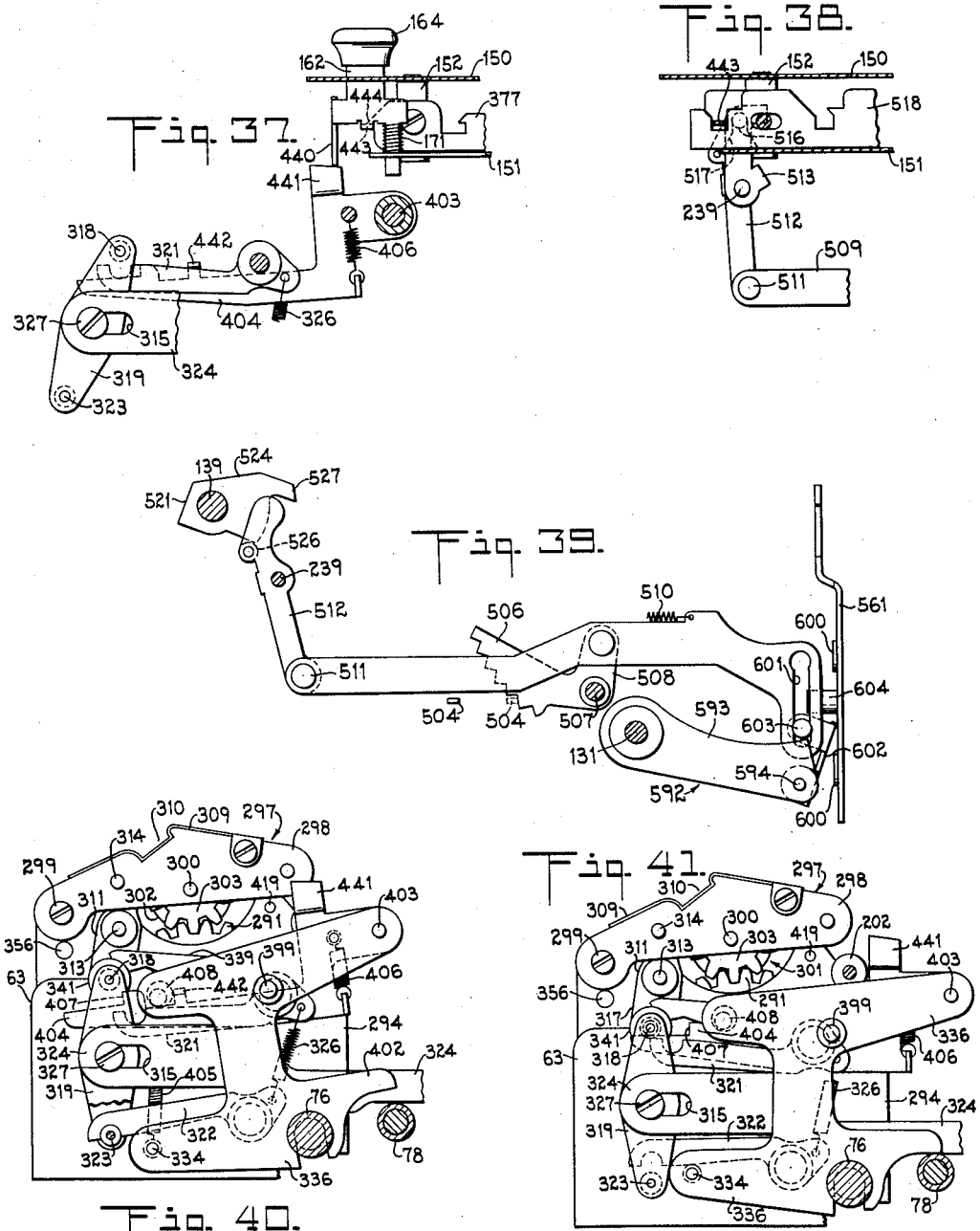
INVENTOR.
Louis M. Llorens
BY
Dale A. Bauer
ATTORNEY.

Dec. 22, 1959 L. M. LLORENS 2,918,212
CALCULATING MACHINE
Filed July 29, 1950 10 Sheets-Sheet 9
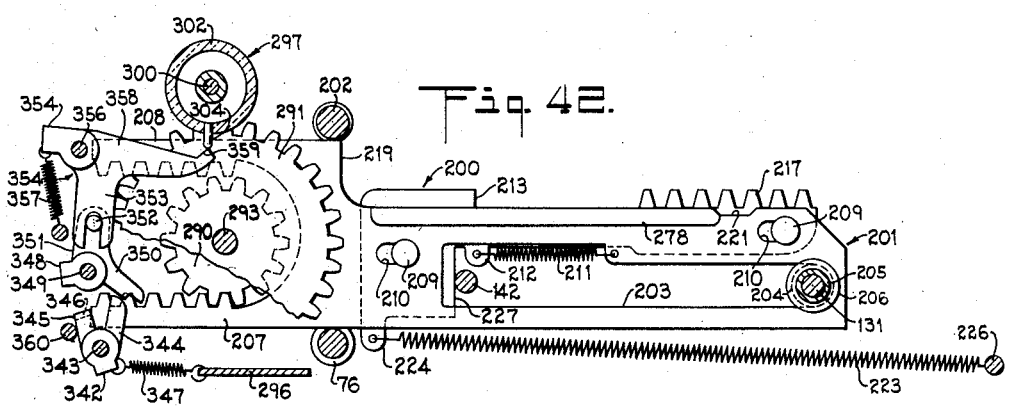
Fig. 42.
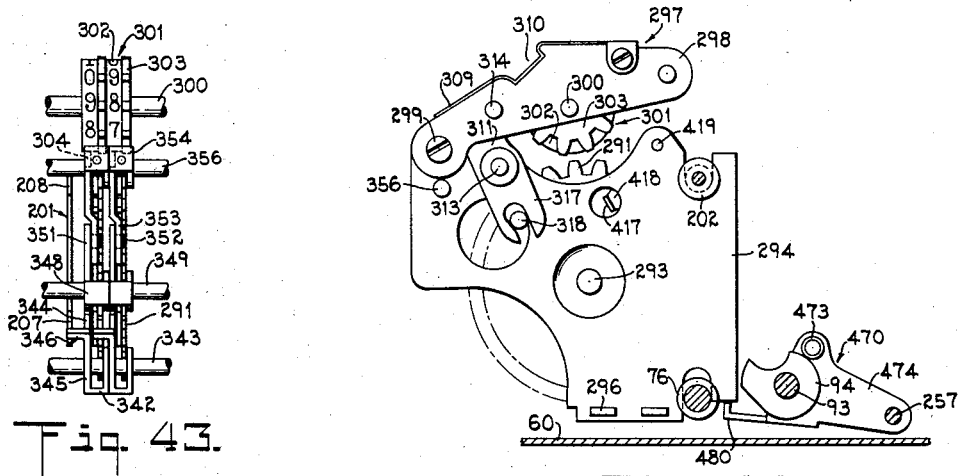
Fig. 43.
Fig. 44.
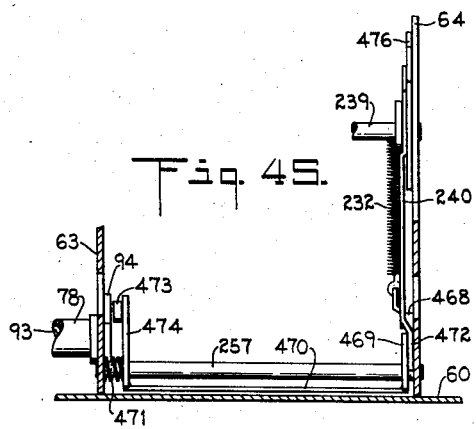
Fig. 45.
INVENTOR.
Louis M. Llorens
BY
Dale A. Bauer
ATTORNEY.

Dec. 22, 1959　　　L. M. LLORENS　　　2,918,212
CALCULATING MACHINE

Filed July 29, 1950　　　　　　　　　　　　10 Sheets-Sheet 10

INVENTOR.
Louis M. Llorens
BY
Dale A. Bauer
ATTORNEY.

United States Patent Office 2,918,212
Patented Dec. 22, 1959

2,918,212
CALCULATING MACHINE

Louis M. Llorens, Long Island City, N.Y.

Application July 29, 1950, Serial No. 176,741

26 Claims. (Cl. 235—60.28)

This invention relates to calculating apparatus and more particularly to machines adapted to perform a plurality of mathematical operations and including printing and visual totalizing mechanisms.

One of the objects of the present invention is to provide novel apparatus for making mathematical computations which embodies novelly constructed parts that are so assembled and associated in a novel manner to perform plural functions, whereby the size, weight and total number of parts are reduced considerably below those of known machines capable of performing comparable functions.

Another object is to provide a novel, readily-portable computing machine which is of comparably simple construction, the parts of which may be assembled in an advantageous manner so as to facilitate inspection and repair.

Another object is to provide novel means in calculating apparatus for printing or listing the figures entered into the computing mechanism, said means being associated and combined in a novel manner with the totalizing or accumulating mechanism.

Still another object is to provide novel and simplified means for operating and automatically controlling the operation of machines of the above character whereby the possibilities of error or damage to the machine as a result of improper or injudicious operation or handling are minimized.

A still further object is to provide calculating apparatus embodying novel construction whereby direct subtraction of numbers is mechanically accomplished.

Another object is to provide a novelly constructed computing machine which will perform more mathematical operations mechanically and with less of the personal equation than any known machine of comparable size and simplicity.

Another object is to provide calculating apparatus embodying a novelly constructed printing device of the hammer-blow variety, the type bars thereof being actuated and controlled in a novel manner, and said apparatus also embodying novel means for rendering said printing device ineffective without otherwise interfering with the normal functioning of the apparatus.

It is another object of this invention to provide a novelly constructed keyboard unit for a calculating machine which may be novelly combined with the other operating parts of the structure so as to be readily removable without the necessity for disconnecting any operating parts or affecting the operability of the machine.

It is also an important object of the invention to provide novelly constructed totalizing means and novel means for operating and controlling the same, including novel simplified means for effecting a carry-over operation.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a top plan view of a calculating machine constructed in accordance with the present invention, the outer casing and the keyboard being removed and certain of the parts having portions thereof broken away for purposes of clearer illustration;

Fig. 2 is a vertical longitudinal or side sectional view substantially on the line 2—2 of Fig. 1;

Fig. 3 is a vertical longitudinal sectional view substantially on the line 3—3 of Fig. 1, with the stop-pin carriage omitted;

Fig. 4 is a fragmentary vertical transverse sectional view substantially on the line 4—4 of Fig. 2;

Fig. 5 is a fragmentary detail side elevation view, partly in section, showing the locking comb for the printing quadrant actuating rack in locking position, portions of the associated totalizer actuating slide rack being broken away for purposes of clearer illustration;

Fig. 6 is a vertical longitudinal sectional view substantially on the line 6—6 of Fig. 1;

Figs. 7, 8 and 9 are detail side elevation views, partly in section, of the handle operated sector in different positions;

Fig. 10 is a fragmentary side elevation view, partly in section, showing the totalizer and actuating mechanism therefor in position for effecting a totalizing operation;

Fig. 11 is a vertical longitudinal sectional view, taken substantially on the line 11—11 of Fig. 1;

Fig. 12 is a vertical longitudinal sectional view substantially on the line 12—12 of Fig. 1;

Fig. 13 is an enlarged detail end elevation view, partly in section, of the stop-pin carriage;

Fig. 14 is a detail side elevational view of one of the stop-pin holding springs shown in end elevation in Fig. 13;

Fig. 15 is a detail end elevational view, partly in section, of the stop-pin carriage escapement mechanism;

Fig. 16 is a vertical longitudinal or side sectional view substantially on the line 16—16 of Fig. 1;

Fig. 17 is a vertical longitudinal sectional view taken substantially on the line 17—17 of Fig. 1;

Fig. 18 is a detail top plan veiw of a portion of the totalizer unit with the cover therefor removed for purposes of clearer illustration;

Fig. 19 is an enlarged detail end elevational view, partly in section, showing a number of the type-quadrant locking members in assembled relation;

Figs. 20 and 21 are enlarged top plan and side elevational views, respectively, of one of said type-quadrant locking members;

Fig. 22 is a detail top plan view of the keyboard unit with the key buttons omitted and a portion of the top plate thereof broken away for purposes of clearer illustration;

Fig. 23 is a front elevation view of said keyboard unit looking from the bottom of Fig. 22, and showing parts of the stop-pin carriage and escapement mechanism in dotted lines;

Fig. 24 is a vertical transverse sectional view on the line 24—24 of Fig. 22, and showing particularly the backspacer mechanism;

Fig. 25 is a side elevational view, partly in section, of said keyboard unit looking from the left in Fig. 22, and including the elements controlled by the non-print and subtraction keys;

Fig. 26 is a detail front elevational view, partly in section, of the symbol selector slide of the keyboard unit, and including elements operated by said slide;

Fig. 27 is a detail side elevational view, partly in section, showing the division key depressed with associated parts;

Fig. 28 is a detail side elevational view, partly in section, showing the subtraction key depressed with associated parts;

Fig. 29 is a side elevational view, partly in section, of the keyboard looking from the right in Fig. 22, the key lock slide being shown in position to permit depression of the total or sub-total keys;

Fig. 30 is a vertical longitudinal sectional view substantially on the line 30—30 of Fig. 22 showing the key-lock slide in normal position to prevent depression of the total and sub-total keys;

Fig. 31 is a vertical longitudinal or side sectional view substantially on the line 31—31 of Fig. 22, the symbol-selector slide and elements associated therewith being shown in normal positions;

Fig. 32 is a view similar to Fig. 31, but showing the position of the parts when printing a total;

Fig. 33 is a view similar to Fig. 31, but showing the position of the parts when printing a sub-total;

Fig. 34 is a detail side elevational view, partly in section, showing the repeat key depressed and the elements actuated thereby;

Fig. 35 is a detail side elevational view, partly in section, showing the total key depressed and locked, and some of the elements actuated thereby;

Fig. 36 is a detail side elevational view, partly in section, showing the sub-total key depressed and locked, and some of the elements actuated thereby;

Fig. 37 is a detail side elevational view, partly in section, showing the non-add key depressed and locked, and some of the elements actuated thereby;

Fig. 38 is a view similar to Fig. 31, but showing the symbol-selector slide and associated elements in position for a non-add operation;

Fig. 39 is a detail side elevational view, partly in section, showing the symbol controlling mechanism and the inked ribbon lifting mechanism, said mechanisms being shown in position for effecting a subtraction operation;

Fig. 40 is a fragmentary side elevational view, partly in section, showing the totalizer and actuating mechanism therefor in the positions occupied when printing a total;

Fig. 41 is a view similar to Fig. 40, but showing the totalizer and actuating mechanism in the positions occupied when printing a sub-total;

Fig. 42 is a detail side elevational view, partly in section, showing particularly the carry-over mechanism in position for effecting a carry-over;

Fig. 43 is a fragmentary front elevational view of the carry-over mechanism, viewed from the left in Fig. 42;

Fig. 44 is a fragmentary side elevational view, partly in section, showing the totalizer and slide rack gear frame unit in raised or subtraction position;

Fig. 45 is a fragmentary vertical transverse sectional view, looking from the right in Figs. 12 and 17, showing the mechanism for controlling the raising of the rack gear frame unit of Fig. 44, the section being taken approximately on line 45—45 of Fig. 17;

The single embodiment of the invention illustrated in the accompanying drawings, by way of example, is in the form of a manually-operable, readily-portable calculating machine of the so-called ten key type. The machine is capable of effecting direct mechanical addition and subtraction and may be used to readily effect multiplication and division. Means are provided for listing or printing the figures set into the machine as well as identifying marks for indicating the results and the nature of the computations, the printing mechanism being of the so-called hammer-blow type. The illustrated machine also embodies visual totalization or accumulation.

Figure 1:
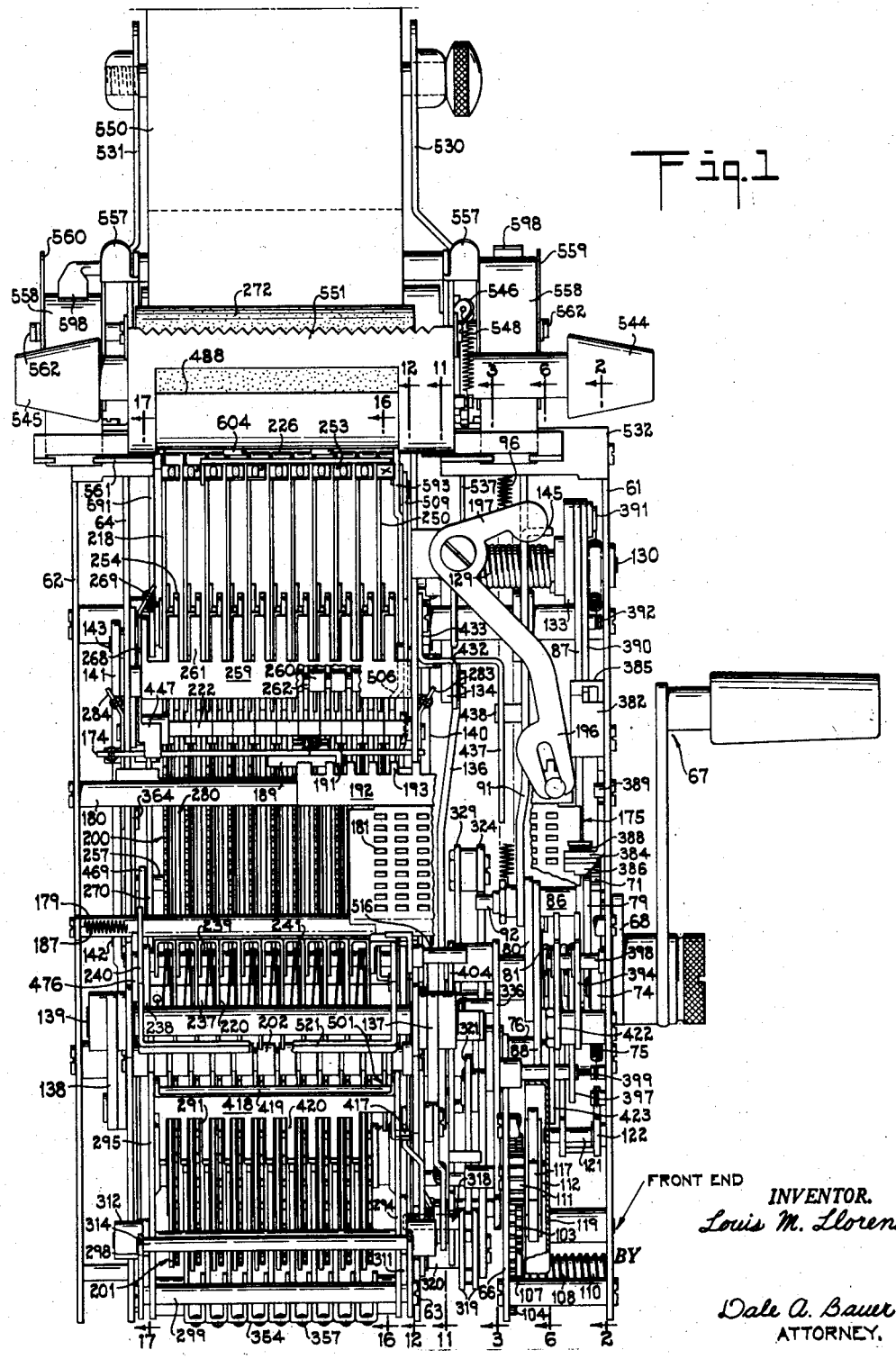
Figure 46:
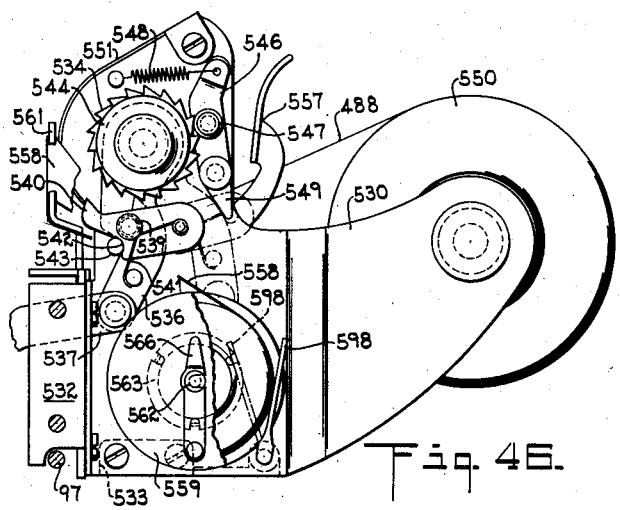
Fig. 46 is a side elevational view of the paper and ribbon feed unit or printing platen assembly.

In the form shown, the basic frame or support for the operating parts of the machine comprises a base 60 to which a plurality of upright longitudinally extending frame members or plates are secured in any suitable known manner (Fig. 1). Two outside frame members 61 and 62 serve as supports for various operating and stationary parts. Two inside frame members 63 and 64 serve as supports and are cut away and perforated wherever necessary to accommodate other parts. A shorter vertical frame member 66 is provided at the forward end of the machine between members 61 and 63. These five upright frame members are connected together by a plurality of horizontal tie rods or the like, most of which perform additional functions and will be more specifically identified as the description proceeds.

In the interest of brevity and uniformity the end of the machine nearest the operator, i.e. the end at the bottom in Fig. 1, is herein treated as and called the "front" of the machine, whereas the end remote from the operator is referred to as the "rear" of the machine. The terms forward movement and rearward movement are used to identify movements toward the front and rear of the machine, respectively. Unless otherwise stated, the terms clockwise and counter-clockwise are used to identify movements of pivoted parts when viewed along their axes from the front, top or right hand side as viewed in Fig. 1, and the terms right-hand and left-hand are used to identify movements of parts or directions as viewed from the right or the front in Fig. 1.

BASIC DRIVING OR POWER INPUT MECHANISM (*Figs. 1, 2, 4 and 6 to 9*)

The invention contemplates novel simplified means embodying only a small number of compactly assembled parts for imparting to the operating mechanisms the necessary power or energy and for controlling the operating speed independently of the speed or rate at which the power is applied. In the illustrated embodiment, operation is manually effected by means of a handle 67 but it will be understood that electrical or other power means could be substituted. The handle is suitably and preferably removably mounted for rotation with a rigid assembly comprising a plate or arm 68 and a stub shaft 69 (Fig. 4) which is journalled in a bushing in side frame member 61 and held in axially fixed position by a split ring engaging a groove in the shaft or by other suitable known means. Securely mounted on arm 68 and projecting inwardly through a suitable opening in side frame 61 is a pin or stud 70 through which power is transmitted to the operating parts during each forward or operating stroke of the handle, i.e. toward the operator as viewed in Figs. 1 and 4.

Rotatably journalled on shaft or rod 69 is a sleeve 77 formed integrally with an arm or sector 71 (Fig. 2) which has a notch or groove in the rear or right hand edge thereof to receive actuating pin 70 for purposes to hereinafter appear. Arm or sector 71 has an arcuate slot 72 therethrough and the outer arcuate edge-surface thereof is smooth at the forward end and provided with serrations or V-shaped notches 73 at the rear end portion thereof. Said edge-surface is adapted to cooperate with a spring-biased double acting pawl 74 that is pivotally mounted on a stud projecting from the inner face of frame member 61. When the parts are in normal or non-operating position, the full stroke sector 71 and pawl 74 assume the positions shown in Fig. 2, the pawl being biased counter-clockwise by spring 75. During the initial part of the operating stroke of handle 67 when the sector 71 is moved by pin 70 to the position shown in Fig. 7, pawl 74 rides on the smooth edge surface of the sector so that the parts are free to return to starting position if the handle is released. As will appear hereinafter, this feature is utilized to effect by operation of handle 67 the removal of an erroneous amount which has been set in the machine through the keyboard or the pin carriage controlled thereby.

When, during the operating stroke of the handle, said pin 70 has proceeded to the point represented in Fig. 8, pawl 74 will engage a serration 73 and thereafter prevent any return movement of sector 71 and other parts operated thereby until the sector passes beyond the pawl, as shown in dot and dash lines in Fig. 9. In this position the sector has engaged a stop sleeve on a rod 76. Thus, once the pawl 74 engages the serrations 73, the cycle of operation thus commenced must be completed. It will be noted, however, that handle 67 and pin 70 are free for return movement at all times, thus eliminating any danger of introducing an error in the calculations or causing damage to the machine by a forced return stroke of the operating handle. On the return or clockwise movement of sector 71 after each operating stroke, pawl 74 is cocked in the opposite direction (as shown in Fig. 9) to engage serrations 73 in such manner as to prevent any subsequent full or partial effective operating or forward stroke of handle 67 or detrimental interference with the operating parts until the machine has completed the operating cycle for which it has been energized by the full forward stroke of handle 67.

Freely journalled on the tubular hub 77 of sector 71 is a sleeve 78 (Fig. 4) on which two radially extending arms 79 and 80 are rigidly secured in axially spaced relation for angular movement therewith. This sleeve and arm unit is connected to sector 71 through a yieldable torque transmitting connection which, as shown, comprises of a coil spring 81. The latter surrounds sleeve 78 between arms 79 and 80 and the opposite ends thereof engage axially extending pins or lugs 82 and 83 on arm 80 and sector 71, respectively. Extending between the outer ends of arms 79 and 80 is a pin or rod 84 whereby the motion of said arms may be transmitted to other operating and control parts. The right hand headed end of rod 84 extends freely through slot 72 in sector 71 and the space between the head on rod 84 and arm 79 is sufficient to permit free relative angular movement of said arm and sector to the extent permitted by the slot. The reduced ends of a spacer sleeve 86 fitted between arms 79 and 80 and surrounding rod 84 serve as bearings and provide suitable axial space for two links 87 and 88. Link 87 is a main operating link and has a slot 89 (Fig. 2) for receiving one end of the spacer sleeve, whereas link 88 is pivoted on the sleeve (Fig. 6) and constitutes part of a connection to a speed governing mechanism to be hereinafter described.

The threaded left end of rod 84 is operably engaged by a nut 90 (Fig. 4), the reduced cylindrical right hand end portion of which butts against arm 80 and serves as a pivot bearing and axial spacer for a link 91 (Fig. 6), hereinafter sometimes referred to as the pin carriage return arm. The other or left end of nut 90 is also reduced and forms an operating pin or stud 92, the function of which in connection with the totalizing or accumulating mechanism will be hereinafter described.

Sleeve 78 extends to the left (Fig. 4) beyond the end of shaft 69 and into abutting engagement with a bushing or bearing in inside frame member 63. Passing through said bushing and into sleeve 78 and secured to the latter by a pin or other suitable means is a stub shaft 93 to which is secured a cam 94 that performs a plurality of functions, as will hereinafter appear.

Certain of the above described parts may be returned to and yieldably held in non-operating position (Figs. 2 and 6) by a spring 96 connected between a fixed rod 97 or the like and a lug 98 on link 91. If desired, this spring may be connected directly to sector 71. During the initial portion of the return stroke of sector 71 from stop 76, said spring 96 is assisted by other resilient means to be later described.

OPERATING-SPEED GOVERNOR

*(Fig. 6 and lower right hand corner of Fig. 1)*

Governor means of novel construction are provided in novel combination with the above described driving or operating means for controlling the operating speed of the machine and for preventing too rapid operation thereof in response to direct excessive force applied by an operator or other power source. As shown, the governor mechanism (Fig. 6) is located in the lower right hand corner of Fig. 1 of the drawing and is connected with the parts which it controls through link 88 which, as mentioned above, is pivotally connected to the movable axis 84, 86. The other end of link 88 is pivotally connected to a crank arm 99 which is in turn pivotally mounted on a rod 100 between frame plates 61 and 66 and held in spaced relation to said plates by suitable spacer sleeves on the rod. A gear segment 101 is pivotally mounted on rod 100 and is connected to crank 99 by a pin 102 in axially spaced relation thereto. Gear segment 101 meshes with a small pinion 103 which is integrated with a larger gear 104 rotatably supported on a stud 106 mounted in and projecting from frame plate 66. Since gear 104 is thus connected with the rocker assembly including arms 79 and 80, the speed of operation of the machine during both the operating and return strokes of said rocker assembly may be controlled by controlling the rotational speed of said gear.

Speed control for normal operation is obtained primarily by a simple friction brake which, in the form shown, comprises a brake shoe or button 107 (Figs. 1 and 6) held in continuous yielding engagement with the right side surface of gear 104 by a coil spring 108. Said shoe is secured to a rod 109 that is slidably received in and supported by a tube 110 mounted on frame plate 61. The spring surrounds tube 110 and is interposed under compression between brake shoe 107 and frame plate 61. The desired speed can be adjusted by varying the force or compression of spring 108.

Centrifugally operated braking means are also provided to intermittently complement the continuously operating braking means above described. As shown, the centrifugal brake is driven by gear 104 through a pinion 111 in constant mesh therewith. The latter is rotatably mounted on a stud 112 secured to and projecting from frame plate 66. Integrated in any suitable manner with pinion 111 is a plate or disc 113 to which a similar plate 114 is secured in axially spaced relation by pins 115, 116 with suitable spacing sleeves thereon between the plates. Mounted between plates or discs 113, 114 for rotation therewith and pivotal movement about eccentrically mounted pins 115, 115 are two fly-weights 117. The latter are yieldably held in normal or full line position (Fig. 6) against stops 116 by coil springs 118 interposed between laterally projecting lugs on disc 114 and extended portions of the weights.

A pan-shaped brake drum 119 is staked or otherwise nonrotatably secured to the end of stud 112 and the annular peripheral flange thereof surrounds the centrifugal fly-weight assembly described above. The relationship of the parts is such that when weights 117 are pivoted toward dotted line position (Fig. 6) against the efforts of springs 118 in response to centrifugal force, a knob 120 on each weight swings into frictional engagement with the inner surface of the flange of drum 119. This creates an additional frictional drag that limits any further increase of speed. As a further precaution against any rotation of brake drum 119 the same may be connected to frame member 61 by a pin 121 which also serves as a support for other parts to be described.

From the above description of the power input linkage and speed control governor, it will be seen that when handle 67 and sector 71 are actuated on a forward or operating stroke at a speed greater than that at which crank arms 79, 80 and hence other parts of the machine are permitted by the governor to operate, the handle and sector may proceed in advance of said arms to the extent permitted by the pin and slot connection 84, 72. This advance movement, when made necessary by the operator, merely effects a further tensioning of spring 81. Under proper normal operating conditions, energy is transmitted through spring 81 so that arms 79, 80 will move at the same angular speed as handle 67. Accordingly, pin 84 does not normally depart appreciably from the upper or forward end of slot 72 where it is yieldably held by the initial tension of spring 81.

Novel means are provided for insuring a full forward or operating stroke of the operating parts of the machine whenever there has been a full stroke of the operating handle; that is, means are provided to prevent any return movement of the operating parts independently of the return movement of the handle until said parts have completed a full power stroke. In the form shown, said means comprises a locking member 122 (Fig. 2) for locking sector 71 in its forward or full stroke position adjacent stop 76 therefor whenever the machine parts have not completed a full forward or operating stroke. Member 122 is pivotally mounted on rod 121 and comprises two axially spaced arms 124 and 126, the same being urged in a counter-clockwise direction by a spring 127 to yieldably maintain arm 126 against stop 76. Arm 124 is in the same plane as sector 71 and the lower rear corner thereof is squared for locking engagement with the forward tooth or notch 73 on the sector. Extending rearwardly and upwardly from arm 126 into the path of spacer 86 on rod 84 is a finger or lug 128.

During normal or proper operation, spacer sleeve 86 engages lug 128 and pivots pawl 122 clockwise so that arm 124 will not engage a sector tooth 73. However, when arms 79, 80 and, hence, sleeve 86 lag behind the sector 71 as a result of too rapid forward operation of the latter, and the sector has passed the point beyond which locking pawl 74 is no longer effective to prevent return movement as heretofore described, pawl arm 124 will engage a sector tooth 73 and prevent return movement of the sector. Under these conditions the sector will be released for return movement only after the governor has permitted spring 81 to impart a full forward stroke to crank arms 79, 80. Release is effected by sleeve 86 engaging lug 128 and pivoting member 122 clockwise out of locking engagement with sector 71, 73.

MAIN OPERATING LINKAGE

*(Figs. 1, 2, 3, 11, and 17)*

On the so-called forward or operating stroke of handle 67, a substantial portion of the operating parts of the machine are actuated by spring 81 which is under initial tension and functions as a yielding connection between the handle and the main operating parts of the machine in the manner heretofore described. In addition to actuating certain of the operating parts the operating stroke also effects a sufficient tensioning of other resilient means to supply the necessary energy for returning some parts to normal position and for actuating others on the return stroke. The chief resilient means for this purpose comprises a relatively heavy coil spring 129 (Figs. 1 to 3). The latter is coiled around a rock shaft 130 journalled at its ends in frame plates 61 and 63. One end of the spring engages a spacer sleeve on a tie rod 131 and the other end engages a pin 132 on a rocker arm 133 secured to shaft 130 for imparting oscillatory movement thereto. The clockwise angular movement of the rocker arm by the spring is limited by the sleeve on tie rod 131 (Fig. 2). The upper end of rocker arm 133 is pivotally secured to main operating link 87. Thus, on the counter-clockwise or operating stroke of arms 79, 80 after cross pin 84 engages the left or forward end (Fig. 2) of slot 89 in link 87, the latter is moved to the left or forwardly, thereby rocking the arm 133 and shaft 130 counter-clockwise to wind up spring 129 and to actuate and control certain of the main operating parts of the machine in a manner to be hereinafter described. It may be here noted that rod 84 does not engage the forward end of slot 89 during the forward stroke of handle 67 until about the time that pawl 74 engages a serration 73 on sector 71. The prior or initial portion of said stroke is utilized to pre-set some of the machine parts, such as by cam 94, in preparation for actuation or release for operation of other parts controlled by the main operating linkage, as will more fully appear as the description proceeds.

Rigidly secured to shaft 130 for oscillatory movement therewith is a crank 134 (Fig. 3), the lower forwardly extending portion of which is pivotally connected to a link 136. The forward end of said link is pivotally secured to the lower end of the right hand end arm 137 (as viewed in Fig. 1) of an oscillating arm assembly comprising depending end arms 137, 138 rigidly connected by a cross shaft 139 journalled in frame members 63, 64. Pivotally connected to the lower ends of arms 137 and 138 and extending rearwardly therefrom are two links 140 and 141, respectively. The latter are additionally connected to each other by two transverse bars 142 and 143 which function to actuate other parts of the apparatus in a manner to be hereinafter described.

KEYBOARD UNIT

*(Figs. 22 to 25)*

Numerical data is put into the machine by means of digit and symbol keys mounted in a keyboard unit which is novelly constructed and combined with the remainder of the structure in such a manner that the same may be readily removed for purposes of inspection and repair without in any way affecting the normal operability of the machine. It is accordingly, an easy matter to obtain a full view of the operating parts of the machine in operation to thus facilitate discovery of the causes for operational failures. In the illustrated embodiment, the keyboard unit comprises an upper plate 150 and a lower plate 151 secured together in vertically spaced relation by four posts 152, 153, the lower plate being removably held in place by screws which threadedly engage said posts. Slidably mounted in this frame are ten digit keys and eight symbol or control keys, all shown in Fig. 22 with the finger buttons removed in the interest of clarity. The digit keys are indicated by numerals "0" to "9," inclusive, and the symbol or operational keys are identified as follows: non-print key 154, back spacer key 156, division key 157, subtraction key 158, repeat key 159, total key 160, sub-total key 161 and non-add key 162.

Each of the key members is made of a strip of metal comprising a shank 163 (Fig. 23) which supports a finger button 164 and slidably extends through a suitable guide slot in top plate 150. Between plates 150 and 151 each key member is divided and suitably contoured to form a leg 166 that slidably extends through a slot in lower plate 151 and a shorter leg 167 which is adapted to engage the lower plate to limit the downward movement of the key. Additionally, each of the ten digit key members has a horizontal arm 168 which over-rides a vertically movable cross-bar 169 and all except the "9" key has a pin operating leg 170 projecting downwardly through lower plate 151 from a horizontal arm, which in some instances is arm 168 or an extension thereof. A spring 171 surrounds each guide leg 166 and yieldably supports the key in inoperative position. Although the digit key members are all differently shaped between the frame plates, each has the same basic parts and the pin operating legs 170 thereof are all arranged in fore- and aft-alignment and in numerical sesuence ("0" to "8") from front to back as indicated at 170, 170 (Fig. 22). The construction of each of the symbol or control keys will be more specifically hereinafter described when the coaction thereof with other parts of the structure is described.

Bar 169 is supported by a bail consisting of side arms 172, 172 and a cross-piece 173. Said bail is pivotally mounted on reduced portions of screws which have threaded engagement with and project through posts 153 (Fig. 22) and bar 169 rests by gravity upon an upwardly biased lever 174 (Figs. 15 and 23) of an escapement mechanism which controls the movement of a traveling stop-pin carriage to be next described.

TRAVELING STOP-PIN CARRIAGE

*(Figs. 1, 2, 13, 14, 15 and 16)*

Mounted below the keyboard for cooperation therewith and with the main operating parts of the machine is a traveling carriage 175 which is actuated and controlled in a novel manner and is novelly constructed to minimize the number of parts and thereby facilitate the assembly and disassembly thereof. In the specific form illustrated, said carriage comprises a frame (Fig. 13) consisting of a top plate 176 and a bottom plate 177 secured together and vertically spaced by side plates 178, 178. The forward ends of the latter are slotted and the rear ends thereof are perforated to receive tie rods 179 and 180, respectively, which extend between outside frame members 61 and 62 and support the carriage for reciprocating movement transversely of the machine below the keyboard.

The upper and lower plates of the stop-pin carriage frame have vertically aligned slots therein, arranged in transverse rows and longitudinal columns, there being nine pairs of vertically aligned slots in each row and column in the illustrated structure. Slidably mounted and guided in each said pair of vertically aligned slots is a stop pin 181. Each pin has two V-shaped notches in the right hand edge thereof, as viewed in Fig. 13, and oppositely facing shoulders on the left edge that engage plates 176 and 177 to limit the vertical movement of the pin.

Each pin 181 is yieldably held in one of its two limiting positions by novel resilient means. For each longitudinal column or row of pins 181 there is provided a single comb-like resilient member 182 (Fig. 14) that fits between adjacent longitudinal columns or rows of the pins and between right hand side plate 178 and the first row of pins on the right. Each resilient comb member 182 consists of a series of nine resilient tongs or fingers 183 with V-shaped end portions that normally engage the lower grooves or notches in the pins 181 and a solid portion 184 that yieldably engages the flat surfaces of the pins in the adjacent longitudinal row. Each resilient comb 182 may be readily removed by sliding it endwise from the carriage frame so that worn or defective springs may be readily replaced. The pins 181 in the front transverse row or line are adapted to be engaged and moved downwardly by the "0" key member to a position such that a spring finger 183 engages the upper notch in the pin and the lower end of the pin extends below lower plate 177 (dotted position 181a, Fig. 13). The pins in the next or second transverse row toward the rear are similarly operable by the "1" key, the next or third row by the "2" key and so on, the last or rear row being operable by the "8" key. Return or upward movement of a stop-pin 181 is effected by a cam surface 186 in a manner to be hereinafter described.

The stop-pin carriage is normally biased for movement toward the left side of the machine, as viewed in Fig. 1, by a spring 187 anchored to frame plate 62 (Fig. 1) and upper plate 176 adjacent the right hand edge thereof (Fig. 13). Movement of the carriage by the spring is controlled by an escapement mechanism comprising arm 174 pivotally mounted on a bracket projecting from frame plate 64 (Figs. 1 and 15) and biased in a counter-clockwise direction by a spring 188, as viewed from the front of the machine. The free end of arm 174 extends into a guide slot in frame plate 63 which limits the upward or counter-clockwise movement thereof. Pivotally mounted on arm 174 is a pawl 189, the free end of which is biased upwardly by a spring 190 to a limiting position determined by a lug 191 on arm 174. Said lug projects forwardly from arm 174 to the immediate left of the nose of pawl 189 for engagement thereby and the lug and pawl cooperate with a slotted member or rack 192 secured to horizontal ears on the rear edge portions of the carriage side plates 178 to control the step-by-step movement of the carriage toward the left, as viewed from the front. The teeth or prongs 193 of rack 192 project rearwardly from the carriage and corresponding surfaces thereof are transversely spaced to correspond with the transverse spacing of the longitudinal or fore-and-aft columns or rows of stop-pins 181. When escapement arm 174 is in normally raised position, the nose of pawl 189 extends into a notch between the teeth of the rack 192 and prevents movement of the carriage toward the left by spring 187. Whenever arm 174 is depressed by bar 169, which is in turn depressible by each digit key as heretofore described, the nose of the escapement pawl 189 will move below the rack 192, 193. Simultaneously, lug 191 will move into the notch vacated by the pawl, thus permitting the carriage to move slightly to the left into engagement with said lug. When arm 174 is now pivoted upwardly by spring 188 upon release of the digit key and bar 169, the carriage is released by lug 191 moving out of the rack notch, but movement of the carriage is shortly stopped again by pawl 189 which enters the next rack slot to the right under the tension of spring 190. Thus, as the digit keys and, hence, bar 169 are successively depressed and released, the carriage will be moved with a step-by-step movement to the left by spring 187 under the control of the escapement mechanism. The longitudinal or fore-and-aft columns of pins 181 are thus successively moved into vertical alignment with the row of stop-pin actuating legs 170 on the digit key members.

The lower ends of stop-pins 181 which have been depressed serve as stops for denominational slide racks to be hereinafter described. As pointed out above, the "9" key does not operate any stop pins, but rather only the bail bar 169 to effect a step movement of the stop-pin carriage 175. For stopping said slide racks in the "9" position, the rear edge of bottom plate 177 on the carriage has a depending stop flange 194.

Return or right hand movement of the stop-pin carriage 175 and tensioning of spring 187 is effected through the medium of a bell crank, an arm 196 of which is bifurcated or forked and straddles and upward extension of one of the screws whereby rack 192 is secured to the carriage (Fig. 1). Said bell crank is pivotally mounted on a horizontal bracket projecting from frame member 63 and the other arm 197 thereof extends toward the right from the pivot for engagement by the operating link 91 which, when moved rearwardly during the return stroke of handle 67 and sector 71 will actuate the crank to impart left-to-right movement to the stop-pin carriage as viewed in Fig. 1. During this return movement, the lower ends of any stop-pins 181 which have been depressed will operatively engage and be moved to normal or up-position by the inclined surface 186 on a laterally projecting lip 198 which is formed integrally with inside frame member 63 and functions as a cam. The left face of the nose of escapement pawl 189 is also tapered or inclined so that the teeth of rack 192 will be effective to depress the pawl against the efforts of spring 190 during the return movement of the carriage and rack.

As above pointed out, link 91 is effective to actuate crank 196, 197 to return carriage 175 to the right, and for this purpose said link has an upper arm 144 with a right angle lug 145 which is engageable with the forward edge of crank arm 197. The rear or right hand end of pivoted link 91 is biased upwardly or counter-clockwise by spring 96 to normally hold the upper edge of a lower arm 146 of the link in engagement with a sleeve on tie rod 131 (Fig. 6). The forward end portion 147 of said upper edge of arm 146 is tapered or curved forwardly and upwardly to function as a cam surface. Thus, when link 91 approaches the end of its rearward stroke and after the carriage 175 has been fully returned, surface 147 engages the sleeve or tie rod 131 and cams link 91 clockwise sufficiently to move upper arm 144, 145 downwardly out of engagement with carriage return crank arm 197. In this manner, link 91, 144 is so positioned as to not interfere with subsequent left hand movement of the pin carriage.

CORRECTION OF ERROR (*Figs. 1, 2, 6, 7 and 13*)

Any suitable means may be provided for actuating lever 196, 197 or carriage 175 independently of the rest of the machine for removing from the carriage any data which has been erroneously set therein by depression of the wrong digit keys. In the illustrated embodiment, the mechanism above described is novelly constructed so that such an error may be corrected by clearing the pin carriage through a partial stroke of handle 67. For this purpose, advantage is taken of the initial movement of operating handle 67 which is permitted by slot 89 in link 87 before the main operating linkage is brought into operation and before pawl 74 operatively engages a serration 73.

During the aforesaid initial movement of handle 67, the pin carriage return link or arm 91 is moved forwardly to the dotted line position illustrated in Fig. 6. In this position, the upper arm 144, 145 of link 91 will have been lifted by spring 96 into the same horizontal plane with crank arm 197. Now, if handle 67 is returned or permitted to return to its normal position by the operator or by spring 96 under control of the governor, link 91, 145 will engage crank arm 197 and function in the manner above described to return carriage 175 to its right-most position. During this movement, all depressed pins 181 will be lifted to normal position as they pass over cam 186. The proper forward position to which handle 67 should be moved will be easily recognizable by the operator because the initial movement is against the relatively light spring 96 whereas the required energy is greatly increased for tensioning main spring 129 when pin 84 engages the end of slot 89.

When only one or more of the last digits set in the machine are erroneous, it may sometimes be convenient to remove the same without completely clearing the pin carriage in the manner just described. This may be accomplished by use of the back spacer key 156 as will hereinafter appear

DENOMINATIONAL SLIDE RACK ASSEMBLIES (*Figs. 1, 5, 16 and 42*)

The figures and symbols entered in the machine through the medium of the keyboard and the stop-pin carriage are mechanically translated into the totalizing and printing mechanisms in a novel manner through a novel arrangement and assembly of slide racks and associated controls therefor. In the illustrated machine, there are nine identical denominational slide racks, each of which is fabricated from a plurality of parts including a printing rack member or slide 200 and a totalizer rack member or slide 201. The latter is supported in vertical or on-edge position and guided for straight line longitudinal movement by upper and lower circumferentially grooved rods 202 and 76, respectively, and one of a series of spool-like bushings 206 on the rod 131 that passes through a central elongated cut-out or slot 203 in rack member 201. The latter engages the reduced portion 204 between the flanges of the bushing 206 mounted on rod 131. The flanges of adjacent bushings 206 are spaced by a reduced hub portion 205 on one end of each bushing for a purpose to appear hereafter (Fig. 42). The forward end of rack slide 201 is bifurcated and the inner or adjacent surfaces of the furcations 207 and 208 are provided with gear teeth for a purpose which will appear hereinafter in connection with the description of the totalizing mechanism.

On the left side (Fig. 1) of each totalizer slide 201, a printing slide 200 is mounted for longitudinal movement therewith and limited movement relative thereto. The mounting or connection of the pairs of slides 200 and 201 is effected by two shouldered studs 209, the reduced portions or shanks of which are secured to slide 200 and ride in grooves 210 in rack member or slide 201. A tensioned spring 211 is connected at its left end (Figs. 16 and 42) to a downwardly extending lug 212 on slide 200 and at its other end to slide 201 thereby exerting a force which tends to move the slides relative to each other to cause pins 209 to occupy the right hand ends of slots 210, as seen in Fig. 42. The upper surface of slide 200 is formed with a ledge or shoulder 213 for cooperation with stop-pins 181, a series of notches 214 in the central portion for cooperation with a locking member 216, and a series of gear teeth 217 for cooperation with a printing type quadrant 218 or 250, all in the manner and for purposes which will hereinafter appear. The upper surface of slide 201 has a shoulder 219 for cooperation with a detent 220 all in the manner and for purposes which will hereinafter appear.

As pointed out above, slide 200 is biased toward the right (Fig. 42) relative to slide 201 by spring 211 and both slides are additionally biased and movable toward the right by a spring 223 connected between a depending lug 224 on slide 200 and a fixed horizontal tie rod 226 mounted in the frame. Return or forward movement of the slide racks 200, 201 toward the left and tensioning of springs 223 is effected by main spring 129 acting through a linkage comprising horizontal cross bar 142 that extends through slots 203 and engages the rear vertical edges of the depending portions 227 of slides 200. As pointed out above, bar 142 is supported at its ends by a pair of identical links 140, 141 (Figs. 11 and 17) the rear or right hand ends of which are supported and connected by rod 143 that travels in and is guided by slots 228, 229 in the inside frame members 63 and 64, respectively. The forward or left ends of links 140, 141 are pivotally connected to the lower ends of the side arms 137, 138 of the oscillating arm assembly which includes horizontal rock shaft 139. The lower end of arm 137 is also pivotally connected to link 136 which is in turn pivotally connected to rocker arm 134 which oscillates with rock shaft 130 and, hence, with the double rocker arm 133 to which spring 129 is connected. Suitable slots or openings 230 are provided in frame members 63 and 64 to permit fore-and-aft movement of rack operating rod 142.

It will thus be seen that when main operating link 87 is moved forwardly and shaft 130 is rocked counter-clockwise (Figs. 2 and 3) during the forward or operating stroke of handle 67, the lower end of rocker arm 134 will move rearwardly and, hence, transmit rearward movement to bar 142 through link 136, arm 137, rock shaft 139, arm 138, and links 140, 141. This rearward movement of slide rack operating bar 142 releases rack assemblies 200, 201 for rearward movement under the influence of springs 223 and performs additional functions in connection with the control and actuation of other units of the machine as will hereinafter appear. The extent of the rearward movement of each rack 200, 201 upon release thereof by rod 142 is determined in a manner to appear hereinafter in accordance with the figure or amount which has been set in the machine through the keyboard. Briefly, the rearward movement of the slide racks is determined by the position of stop-pin carriage 175 and any depressed stop-pins 181 which are engageable by shoulders 213 on rack members 200. When the forward stroke of handle 67 is completed and the parts are released by pawls 74 and 124 for the return stroke or movement, spring 129 becomes effective through the above linkage to return the rod 142 and, hence, slide racks 200, 201 to normal position (Fig. 16) and to thereby again tension springs 223.

SLIDE RACK MOVEMENT CONTROL

(Figs. 1, 4, 12 and 6)

Before slide racks 200, 201 are released for rearward movement by movement of rack operating rod 142 to the rear on the operating stroke of the handle, suitable locking means are put in operation to prevent rearward movement of the slide racks in columns in which no digit has been set through the keyboard and stop-pin carriage. For simplifying the description and facilitating an understanding of the construction, let us assume that only the digit 5 has been set into the machine by depressing the "5" digit key. As previously explained, depression and release of the "5" key will move a stop-pin 181 to its lower or depressed position as indicated at 181a (Figs. 13 and 16). This will be the sixth stop-pin toward the rear in the first or left column of pins on the pin carriage 175. Upon operation of the digit key, the escapement mechanism functions to permit the carriage to move one step to the left (Fig. 1) so that the depressed pin 181a is moved into alignment with the first or right hand denominational slide rack 200 and in the path of shoulder 213 thereof.

Now, upon the subsequent initial forward movement of operating handle 67 and before operating rod 142 begins to move rearwardly, cam 94 (Figs. 4 and 12) rotates counter-clockwise with sleeve 78 and permits a link 231 normally supported by the cam to move downwardly under the influence of a spring 232 (Fig. 17). Link 231 is guided at its lower end by a headed stud 233 engaging a slot therein and is pivotally connected at its upper end by means of a pin 234 to a bail which consists of a transverse cross-bar 237 and rearwardly extending end ears 238 which pivotally support said bail on a shaft or tie-rod 239. The spring 232 is connected under tension between bar 237 and an upwardly biased element 240 to be later described.

Resting on bail bar 237 are a series of locking pawls 220 (Fig. 16), one for each slide rack. Said pawls are pivotally mounted on shaft 239 and each is individually biased in a counter-clockwise direction by a bent spring 241 coiled around shaft 239 and having one end thereof secured to the pawl and the other end in operative engagement with the rock shaft 139. A forwardly extending arm of the pawl has a laterally off-set depending portion 242 adapted to move into the path of shoulder 219 of the slide rack 201 and prevent rearward movement of said rack. The end of arm 242 is preferably guided in the rack guide slots in rod 202. A downwardly and rearwardly extending arm 243 of each pawl 220 is adapted to engage the lower plate 177 of stop-pin carriage 175 when the latter has moved to the left into the path of said pawl arm. The pawls 220, 243 which thus engage the pin carriage are prevented from pivoting counter-clockwise into rack locking position, i.e. with arm 242 in the path of shoulder 219 when bail bar 237 is lowered.

It will thus be seen that when cam 94 is rotated to permit link 231 and bail 237 to move to down position (dotted line, Fig. 16), those pawls 220, 243 which are not held or stopped by the pin carriage plate 177 will be moved by springs 241 to rack locking position. Accordingly, under the conditions assumed above, the locking pawl 220 for the right hand digit rack 200, 201 will engage the carriage and leave said rack free to move rearwardly until the shoulder 213 thereof engages the depressed stop pin 181a (dotted lines, Fig. 16). All the other pawls 220, 242 will pivot counter-clockwise into position to be engaged by shoulders 219 and thus lock the remainder of the slide racks 201 in normal position so the same cannot move rearwardly even when released by operating rod 142. Near the end of each cycle of operation, after rod 142 and racks 200, 201 have been returned to their forward positions, cam 94 is effective to lift arm 231, bail 237 and, hence, all of the rack locking pawls 220, 242 to non-locking position (full lines, Fig. 16) in readiness for the next cycle of operation and to permit movement of the stop-pin carriage to the left.

PRINTING MECHANISM

(Figs. 1, 5, 11, 16, 17, 19, 20 and 21)

The invention comprehends a novelly constructed simplified mechanism which functions in a novel manner with a minimum number of parts to effect so-called hammer-blow printing of the figures and symbols entered in the machine. In the form illustrated, said printing mechanism comprises ten numeral type quadrants 218 and a symbol type quadrant 250, each individually mounted for oscillation on a bodily movable pivot 251. An arcuate portion or segment of each quadrant 218 concentric with said pivot is provided with gear teeth 252 in constant mesh with the teeth 217 on a rack slide 200 (Fig. 16). To each quadrant 218 there is secured an arcuate type bar or strip 253 each bearing in sequence, from top to bottom, the numerals "0" to "9," inclusive. On quadrant 250 the type bar or strip has various symbols designed to assist the operator in interpreting the printed figures. In all other respects quadrant 250 is identical with and functions in the same manner as quadrants 218.

The pivot 251 for each type quadrant 218 is mounted on and carried by the upwardly extending arm of a bell-crank member 254 journalled for pivotal movement on the reduced hub portion 205 of one of the spools or bushings 206 on fixed rod 131. Each said crank 254 is biased for pivotal movement in a clockwise direction (Fig. 16) by a spring 256 anchored to a stationary rod 257 or a pin 258. Means in the form of a rake or comb 259 are provided for holding crank members 254 against clockwise movement by springs 256 until the type quadrants 218 have been pivoted counter-clockwise (Fig. 16) about pivots 251 to desired pre-printing positions determined by the rearward movements of the racks 200 in mesh therewith. Said comb 259 extends transversely across the machine between the frame members 63, 64 and is pivotally mounted at its ends on a fixed rod 260 mounted in said frame members. Said rod has axially-spaced, circumferential grooves 262 in which the upper forward ends of cranks 254 are guided. The rear edge of comb 259 is slotted to form a series of teeth 261, the ends of which are bent downwardly to hook over the upper rear edges of cranks 254 and thereby releasably lock the latter in normal position (full lines, Fig. 16).

The means for actuating comb 259 to release cranks 254 comprises a bell crank pawl 263 (Fig. 17) pivotally mounted on a rod 264 and having a rearwardly extending arm with a laterally extending lug 266 adapted to engage a downwardly facing ledge 267 on a link 268. The latter is pivotally mounted on comb 259 eccentrically with respect to pivot 260 and is biased in a clockwise direction by a spring 269 to thereby yieldably hold link 268 in engagement with lug 266 on pawl 263 and yieldably hold comb 259 in locking position. Pawl 263 has a forwardly extending arm 270 engageable by rack operating rod 142 during the forward movement of the latter and a downwardly extending arm 271 engageable by rod 142 during the latter portion of the rearward movement thereof in the manner heretofore described. Thus, when rod 142 is moved to the rear, it engages arm 271 and imparts counter-clockwise movement to pawl 263. The lug 266 on the pawl engages ledge 267 and lifts link 268, thereby pivoting comb 259 to non-locking position (dotted line position in Fig. 16) and releasing all the type quadrant supporting cranks 254. Each type quadrant which has been moved to a pre-printing position, such as dotted line position A, by a rack slide 200 in accordance with data entered into the machine, will now be carried by a crank 254 under the influence of a spring 256 into printing position B. Sufficient clearance is provided between the meshing teeth on the rack slides 200 and quadrant gear segments 252 to compensate for the small arcuate movement of pivots 251. The desired numeral or symbol on a strip 253 is thus snapped into engagement with an inked ribbon overlying a paper strip on a suitable platen 272 to be hereinafter described.

Those type quadrants which have not been moved to a pre-printing position by rearward movement of their cooperating slide racks 200 are held against rearward movement toward the platen in a novel manner by other locking means controlled by said rack slides 201. As shown, said other locking means comprises the series of overlapping hook members or detents 222 which are pivotally mounted on the transverse stationary bar 264 and may depend upon gravity for their operation in a clockwise direction toward operative locking position (Fig. 16). Each hook member 222 comprises laterally spaced rearwardly extending arms 273 and 274 (Figs. 19 to 21). Arm 273 is in the form of a downwardly facing hook which rides on and operatively engages a pin 276 secured to and extending laterally to the left (Fig. 1) from a crank 254 to hold the latter and, hence, the type quadrant 218 mounted thereon against movement to printing position B by a spring 256 when comb 259 is moved to unlocking position to otherwise release cranks 254. A cam lug 277 extends downwardly from arm 273 into cam groove 221 in the upper surface of rack slide 201 so that, when said slide moves rearwardly with its associated slide 200 to actuate a type quadrant 218 into a pre-printing position A, cam lug 277 will ride out of notch 221 onto the upper edge of slide 201 and thereby lift hooked arm 273 out of the path of pin 276. The crank 254 on which said pin is mounted will then be free to move the type quadrant 218 thereon from pre-printing position A to printing position B upon release of said crank by locking comb 259. Part of the upper edge portion 278 of each rack slide 201 is offset toward the right to provide a better track for detent lug 277.

The novel construction of the present machine is such that upon the initial rearward movement of bar 142 during each cycle of operation, each rack slide 200 is moved rearwardly by springs 211 and 223 through a distance determined by the pin and slot connections 209, 210 to thereby move each type quadrant to "0" pre-printing position, independently of whether or not its companion slide 201 is locked against rearward movement by a pawl 220, 242. For each column in which the operator has not set a numeral larger than "0," there will be no further rearward movement of either slide of the denominational rack assembly 200, 201 and the slide 201 thereof will not therefore be effective to lift the detent or hook member 222 associated therewith to non-locking position. The detents 222 are accordingly novelly constructed and interlocked in such a manner that all said detents to the right (Fig. 1) of the detent in the left-most column in which the operator has set a numeral or digit greater than "0" will be moved to non-locking position, thereby freeing the corresponding cranks 254 and the quadrants 218 thereon for movement to printing position. Thus, in each column to the right of the left-most digit wherein a digit greater than "0" has not been set, the machine will print a "0." To accomplish this result, the right-hand arm 274 of each locking hook or detent 222 has a laterally offset end portion 279 which extends to the right beneath and engages the lower surface of the left-hand arm 273 on an adjacent detent 222. Thus, when one detent is lifted to non-locking or inoperative position by rearward movement of a slide 201, all said detents to the right thereof (Fig. 1) will also be correspondingly lifted to non-locking position independently of any rearward movement of the slides 201 associated therewith. In columns to the left of the left-most digit set in the machine, the detents 222 will remain in locking position and thus hold the corresponding type quadrants against movement to printing position.

The type quadrant operating cranks 254 are returned to normal position by the forward movement of main operating bar 142. For this purpose each crank 254 has a forwardly extending arm 280 with an inclined or cam surface 281 which moves upwardly into the return path of bar 142 when the crank members pivot clockwise to printing position. Thus, when the operating bar 142 is moved forwardly, it first disengages arm 271 of locking pawl 263 thereby freeing link 268 and comb 259 for movement to normal or locking position by spring 269. The force of the latter is also exerted through shoulder 267 and lug 266 to pivot pawl 263 clockwise (Fig. 17). Further clockwise movement of said pawl 263 is thereafter effected by engagement of bar 142 with the lower edge of arm 270 on the pawl. Following the release of pawl 263, bar 142 engages cam surfaces 281 on crank arms 280 and pivots cranks 254 in a counter-clockwise direction (Fig. 16) a sufficient amount to permit locking comb 259 to be snapped into locking position by spring 269.

In order to guard against possible movement of rack slides 200 while the type quadrants are in printing position against the platen 272 and to insure accurate horizontal alignment of the numerals printed by the type quadrants when in printing position, means are provided for locking and aligning said racks during movement of the type quadrants into printing position. As shown herein, said means comprises the locking comb 216 made up of a transverse cross-bar with spaced forwardly and downwardly projecting teeth 282 and end arms 283 and 284 (Figs. 5, 11 and 17). The latter are pivotally mounted on frame plates 63 and 64, respectively, by means of eccentric screws 286 for purposes of adjustment and are biased clockwise to non-locking position by two springs 287. Each of the arms 283 and 284 extends downwardly and forwardly from its pivot and terminates in an inclined surface 288 in the path of rack operating bar 142. Near the end of its rearward stroke prior to its engagement with pawl arm 271 to release the type quadrants for movement to printing position, bar 142 rides up on the forward ends of arms 283 and 284 and pivots the same counter-clockwise. This brings aligned teeth 282 into firm engagement and mesh with notches 214 on the slide racks 200 to properly align the said racks and positively hold the same against movement during actuation of the type quadrants 218.

TOTALIZER MECHANISM (*Figs. 1, 3, 10, 12, 16, 18 and 40 to 44*)

Totalization of the numerical data set into the machine through the keyboard unit is effected by novel means combined and novelly cooperable with slide rack assemblies 200, 201. As shown, the forward end of each slide rack 201 is forked or bifurcated and the furcations 207 and 208 thereof have gear teeth on the inner or adjacent surfaces thereof for alternate cooperation with pinions or gears 290 (Figs. 16 and 42). For computations in addition, which will be first considered, pinions or gears 290 engage the lower toothed arms on furcations 207. Each of the ten slide rack gears 290 is rigidly integrated with a totalizer drive gear 291 and a bushing 292 which is journalled on a shaft 293 and functions also as an axial spacer for adjacent gear assemblies 290, 291. Shaft or rod 293 is supported at its ends in the side wall plates 294 and 295 of a vertically movable frame which includes a tie plate 296 connecting the bottom edges of said side plates. The latter have oppositely disposed slots in the upper and lower edges thereof near the rear edges which receive horizontal tie rods 202 and 76, respectively, which extend between frame plates 63 and 64. Said gear assembly frame is thus guided by said rods for limited straight line vertical movement to permit the gear assemblies 290, 291 to be bodily lifted sufficiently so that pinions 290 will disengage toothed arms 207 and engage toothed arms 208 when direct subtraction is to be effected. Thus, when the arm 207 of a slide rack 201 is in mesh with a pinion 290 and said rack moves rearwardly a distance determined by the magnitude of a digit set into the machine, the gear assembly 290, 291 associated therewith will turn counter-clockwise a proportional amount and upon the return or forward movement of the rack 201, the gear assembly will rotate an equal distance in a clockwise direction.

Such return or clockwise movements of gears 290, 291 during successive cycles of operation are effectively accumulated and a summation thereof and, hence, a summation of the numerals set into the machine is visibly indicated in a totalizer unit 297. The latter comprises a rigid frame 298 which is pivoted on a shaft or rod 299 that is supported by and movable with the slide rack gear assembly frame 294, 295. Mounted in frame 298 for individual rotation on a shaft 300 are ten number wheel assemblies 301 each consisting of a number wheel 302 bearing numerals "0" to "9," a gear 303 having ten teeth adapted to mesh with driving gear 291, and a radially projecting carry-over release pin 304, the purpose of which will be later described (Figs. 16 and 18). When totalizer frame 298 is in normal or raised position (Fig. 16), the number wheel assemblies 301 are held against rotation by a locking comb 306 pivotally mounted on said frame and having spaced teeth or fingers 307 which are bent downwardly at their ends for engagement with adjacent teeth on gears 303. Comb 306 is normally resiliently biased counter-clockwise to locking position by a spring 308. A cover plate 309 is provided with a transverse slot or window 310 through which an operator can view only one numeral on each wheel 302.

The accumulator or totalizer carriage 297 is normally supported in up or inoperative position by a pair of cam hook lift arms 311, 312 carried by and rotatable with a rock shaft 313 journalled in the side plates 294, 295 of the slide rack gear frame. Cam surfaces on arms 311, 312 engage a tie rod 314 in the totalizer frame 297 and control the pivotal movement of the latter, said surfaces being so shaped as to permit said frame to pivot clockwise and move number wheel gears 303 into mesh with driving gears 291 when said arms are pivoted clockwise from the normal position shown in Figs. 12 and 16. Said arms hook over rod 314 and positively hold the totalizer unit 297 in operative position (Fig. 10) with said rod resting on tabs 316 formed on the gear frame side plates 294 and 295. Tabs 316 are made sufficiently thin, vertically, to be adjustable for varying the operative position of the unit 297 to insure proper meshing of gears 303 and 291.

At the proper time and prior to the forward or return movement of slide racks 201 and, hence, the clockwise movement of gears 290, rock shaft 313 and arms 311, 312 are actuated to permit frame 297 to drop into operative position (Fig. 10). For this purpose the right hand arm 311 has a forked extension 317 (Fig. 12) which operatively engages a rod or pin 318 projecting laterally to the left from the upper end of a double rocker arm 319 (Fig. 10) journalled on a stud 320 mounted on and extending to the right from inner frame plate 63. Rocker arm 319 preferably comprises two spaced plates (Fig. 1) between which two oppositely facing hooks or pawls 321, 322 are guided. The upper hook or pawl 321 is adapted to engage a spacer on pin 318 between said plates and hook 322 is adapted to engage a similar spacer on a pin 323 connecting the lower ends of said plates.

Pawls or hooks 321, 322 are pivoted on and movable with a totalizer shift arm 324 and the rear ends of said pawls are connected by a spring 326 to thereby bias the hooked ends thereof in outward or diverging directions. Shift arm or slide 324 is supported on-edge for limited straight line horizontal movement by shouldered screw 327 and sleeve 78 which engage slots 315 and 325, respectively, in the slide. Forward or left hand movement of slide arm 324 is effected through a pin 328 which cooperates with a pawl 329. Said pin is carried by the lower end of arm 137 which is actuated in a manner heretofore described and pawl 329 is pivotally mounted on slide 324 at 330 near the rear end thereof. Said pawl has a lower finger 331 that engages bottom frame member 60 to limit counter-clockwise movement thereof, a middle finger 332 with a forwardly inclined lower face riding on sleeve 78 to effect clockwise movement of the pawl when arm 324 moves forwardly, and a top downwardly-hooked finger 333 which cooperates directly with pin 328 in a manner to be next described.

On the forward or operating stroke of the handle 67, pin 328 is carried rearwardly with arm 137 from normal inoperative position (Fig. 3) as heretofore described. The pin engages the tapered forward end (lower edge) of pawl finger 333, lifts it and proceeds past the rearwardly facing hook thereon. The pawl finger 333 then drops again by gravity to its stop or normal position determined by arm 331. At the beginning of the return stroke, as distinguished from the operating stroke, pin 328 moves to the left engaging the hooked upper finger 333 of pawl 329 to thereby impart forward movement to said pawl, shift arm 324 and pawls 321, 322 until pawl 329 is shifted clockwise out of hooked engagement with pin 328 by the coaction of the tapered middle pawl finger 332 with the upper surface of sleeve 78.

During this limited forward movement of slide arm 324 when the parts are set for addition or accumulation, pawl 321 is in operative engagement with pin 318 on the upper end of rocker arm 319. Pawl 322 is at this time supported out of engagement with pin 323 by a pin 334 projecting laterally to the left from a rocker lever 336 to be later described. Accordingly, forward movement of pawl 321 with arm 324 causes counter-clockwise movement of said rocker arm 319 and, hence, forward movement of pin 318 which actuates arms 317, 311 clockwise to move totalizer unit 297 to its lowered or operative position (Fig. 10) in the manner previously described. As said unit is lowered, a projection 337 on locking comb 306 engages frame plate 294 and pivots the comb clockwise, thereby lifting the fingers 307 thereof out of locking engagement with the number wheel gears 303. After unit 297 has thus been lowered, the slide racks 201 are returned by bar 142 to normal forward or starting position, thereby rotating gear assemblies 290, 291 and number wheel assemblies 301. The gear ratios are such that the rotation of the number wheels in each column will be proportional to the size or magnitude of the number set in the machine in that column.

The totalizer unit 297 is again lifted out of operative engagement with gears 291 near the end of the return stroke of each operating cycle. At this time, pin 92 which projects to the left from operating arm assembly 79, 80 engages the front edge of an upwardly projecting lug 338 at the rear end of shift arm 324 and moves the latter rearwardly. This movement of shift arm 324 is translated into counter-clockwise pivotal movement of totalizer unit 297 through pawl 321, pin 318, arm 317, arms 311, 312 and tie rod 314.

A booster detent 339 cooperates with rocker assembly 318, 319 to yieldably maintain the totalizer frame in its limiting positions. Said detent is pivotally mounted on frame plate 63 and has a V-shaped bottom edge surface at the free end thereof which is biased by a spring 340 into continuous engagement with a roller 341 on the pin 318 (Figs. 3 and 10). When the unit 297 is in its limiting positions, one side or the other of said V-shaped surface engages said roller and exerts a yielding effort in the proper direction to hold the frame in that position. Detent 339 also functions to snap the frame into its limiting positions after the roller 341 passes beneath the point or crest of said V-shaped surface on the detent.

CARRY-OVER MECHANISM

*(Figs. 1, 12, 16, 17, 42 and 43)*

Whenever one of the number wheels 302 has made a complete revolution from a position in which "0" is visible in window 310, it becomes necessary to carry an additional digit over into the next adjacent column to the left. For example, when the numeral "9" on the right hand wheel 302 has reached window 310 and "one" is added thereto, the summation is "10," thus making it necessary to move the second (from the right) number wheel to "1" or to the next higher number for which it is then set. This result is obtained in the illustrated machine by novel means constituted by a very small number of simply constructed parts in comparison to prior known means for accomplishing the same purpose.

In the form illustrated, said carry-over mechanism comprises a series of spring biased carry-over pawls 342 pivotally mounted on a tie-rod 343 on the inner frame plates 63 and 64. Each said pawl is formed from a thin piece of sheet metal bent to channel shape for bearing purposes and has at its left end (Fig. 43) two angularly disposed arms 344 and 345 in the same plane (Fig. 42). The ends of arms 345 are bent to the left at right angles to form tabs 346 which function as stops, when in normal position, for limiting the normal forward movement of slide racks 201. Each pawl 342 is normally biased in a counter-clockwise direction by a spring 347.

Arms 344 of pawls 342 cooperate with a series of locking members 348 which are pivotally mounted on a tie-rod 349 between frame plates 63, 64 and have downwardly and rearwardly extending notched arms 350 engaged by pawl arms 344 when in normal position (Fig. 16). In the same longitudinal plane with notched arm 350, each locking member 348 has an upwardly extending arm 351 on which is mounted a pin 352 that extends laterally to the right (Fig. 43) into the slot of a downwardly extending forked arm 353 of a carry-over release pawl 354. There is a corresponding series of said release pawls pivotally mounted on a tie-rod 356 between gear frame plates 294, 295. Each release pawl 354 is biased counterclockwise by a spring 357 and has a second arm 358 extending forwardly between adjacent gear assemblies 290, 291 in the same plane as the inner end of forked arm 353 of the same pawl. Release pawl arms 358 terminate with inverted V-shaped humps 359 on the upper surfaces thereof immediately below number wheels 302 for cooperation with the radially extending pins 304 on the number wheels. Each said pin is located between the numerals 5 and 6 on the number wheel so that as the wheel moves counter-clockwise from "9" to "0" in window 310, pin 304 will engage hump 359 and cam the release pawl 354 in a clockwise direction (Fig. 42) against the efforts of a spring 357. Forked arm 353 of said pawl is thus swung to the left (Fig. 42) and pivots pawl lock 348 counter-clockwise to release stop pawl 342. The latter, when thus released, pivots counter- clockwise under spring tension and frees the slide rack 201 which operates the adjacent number wheel to the left for additional forward movement. This additional forward movement of the rack is effected by spring 211 and the extent thereof, determined by the length of slots 210 in the slide rack 201, is just sufficient to rotate the proper number wheel one tooth or one-tenth of a revolution and thus bring up the next higher number thereon in the window 310.

A pin 304 depresses and passes over a hump 359 in the same cycle of operation, so that any release pawl 354 and associated member 348 are returned immediately to normal position by a spring 357. Stop pawls 342 which have been released are reset to normal position during the operating stroke of the next cycle of operation after the slide racks 201 controlled thereby have been moved rearwardly by springs 223 into engagement with either pawls 220, 242 or a stop-pin 181 on the stop-pin carriage 175. The illustrated means for effecting the resetting of pawls 342 comprises a bail 359 consisting of a cross-bar 360 and two bell crank end arms 361, 362 (Figs. 12 and 17) pivotally mounted on the ends of the tie-rod 343 outside the gear frame side plates 294, 295. Cross-bar 360 is engageable with pawl arms 345 and the upper ends of arms 361, 362 are pivotally connected to the links 363 of identical split or longitudinally extensible links 363, 364 at opposite sides of gear assembly 294, 295. Link 364 carries headed pins which slide in slots 366 of link 363 and the two links 363, 364 are yieldably held in non-extended or shortened relation by a spring 367 and link 364 is biased forwardly by a spring 368. The rear end of link 364 is guided and supported by a stud 369 that engages a slot 370 in the link. Downwardly projecting lugs 371 at the rear ends of links 364, are in the path of rack operating bar 142 so as to be engageable thereby during the last part of the rearward movement thereof. Rearward movement of links 363, 364 in this manner pivots crank arms 361, 363 in a clockwise direction, thereby lifting bail bar 360 in a clockwise arc to reset stop pawls 342 to the position illustrated in Fig. 16 in readiness to stop the racks 201 on the return or forward movement thereof unless said pawls are tripped again for the purpose of effecting a carry-over in the manner described.

PRINTING A TOTAL

*(Figs. 1, 2, 3, 11, 12, 16, 22, 29, 30, 35 and 40)*

The total or summation of the numbers put into the machine is continuously visually indicated by number wheels 302 through window 310. Novelly constructed and novelly operable means are provided for printing this total at the will of the operator and for simultaneously removing the summation from the number wheels in readiness for another computation. In the specific form shown, said means is under the control of a total key 160 which is normally locked against depression by a laterally extending lug 376 thereon that overlies a flat upper surface on key lock slide bar 377 (Fig. 30). The latter is guided and limited in its fore-and-aft movements by stationary pins 378 that are threaded into posts 152 in the keyboard frame and extend through slots in the slide bar. A spring 379 anchored on a pin 378 and connected to a pin 380 on the rear end of the slide bar 377 normally holds the latter in its foremost position (Fig. 30). Means to be next described are adapted to move the slide bar rearwardly to its mid-position (Fig. 29), and positively hold it against forward movement. In this mid-position, lug 376 of the total key overlies the inclined upper surface of a locking tooth 381 on the slide bar. Thus, when the key is depressed, the slide bar is cammed rearwardly until lug 376 passes tooth 381, whereupon spring 379 snaps the bar 377 forwardly to cause tooth 381 to overlie lug 376 and lock the total key in depressed position (Fig. 35).

Movement of key lock slide bar 377 to the rear is effected by means under control of the operating handle 67 and the stop-pin carriage 175, and includes an actuating member 382 (Fig. 2) pivoted on a pin 383 extending toward the left from outside frame plate 61. The forward end of said member has a lateral extension 384 on which is mounted a pawl 386 for pivotal movement about a fore-and-aft axis 387. Said pawl is biased in a clockwise direction (as viewed from the front of the machine or from the left in Fig. 2) against a stop on member 382 by a suitable torsion spring 388 when the forward end of said member is in its lower-most position (dotted lines, Fig. 2) as determined by a stop-pin 389 extending into a groove in the upper edge of said member. The lower end of pawl 386 extends into the path of the upper plate 176 of the stop-pin carriage 175 so that the pawl will be pivoted slightly counter-clockwise by the carriage when the latter moves into and assumes its right-most position. Thus, if member 382 is pivoted to lift pawl 386 above carriage 175 while the latter is in its right hand position, said pawl will swing clockwise so that the lower end thereof will engage said carriage and support said member 382 in the full line position shown in Fig. 2. The rear end of member 382 has a lateral extension 385 which engages pin 380 on key lock slide bar 377 to actuate the latter rearwardly against the efforts of spring 379 (Figs. 2 and 29). The above mentioned full and dotted line positions of actuating member 382 correspond, respectively, with the positions of the key lock slide bar 377 illustrated in Figs. 29 and 30.

The rear lateral extension 385 of actuating member 382 is adapted to be operatively engaged by the upwardly hooked forward end of a latch 390 during rearward movement of the latter to impart the required pivotal movement to said actuating member. Said latch is pivotally mounted on the movable pivot 391 which moves with main operating link 87, the pivotal movement of the latch being limited by a pin 392 projecting from link 87 into an oversized hole in the latch. A spring anchored on pin 392 and connected with a downwardly projecting tab on the latch 390 biases the hooked end of the latter in an upward direction. The latch being thus mounted, moves bodily with link 87 and, hence, in an upwardly-convex arcuate path by reason of the pivotal movement imparted to link 87 by the pin and slot connection 84, 89 and the upwardly-convex arcuate path of pin 84. Accordingly, during rearward movement of latch 390, the hooked end thereof will engage the lower edge portion of the rear lateral extension 385 on member 382 and pivot the latter rearwardly to lift pawl 386 above stop-pin carriage 175. After latch 390 reaches the end of its rearward stroke, continued rearward movement of pin 84 in slot 89 pivots link 87 and hence, latch 390 counter-clockwise and out of hooking engagement with member 382, 385, thereby releasing said member to permit the forward end thereof to drop downwardly to the extent permitted by stop-pin carriage 175 and pawl 386 or by stop-pin 389 if the carriage is not in its right hand position. The upper edge of the forward end of latch 390 is sufficiently broad and may be tapered forwardly and downwardly to guard against locking engagement thereof with extension 385 on the forward stroke of the latch.

If a number has been placed in the machine through the keyboard and carriage 175 has accordingly moved to the left, the timing is such on the return stroke of the operating handle 67, that latch 390 will engage, lift and release actuating member 382 before the stop-pin carriage is returned to its normal right hand position by crank 196, 197 and link 91. Thus, at the end of each cycle of operation during which a number has been put into the machine, member 382 will assume its dotted line or lower-most position (Fig. 2), key lock slide bar 377 will be all the way forward, and the total key 160 will be locked against depression (Fig. 30) by the flat upper surface of the slide bar. Said key may be released for depression by operating the machine through one cycle without setting a numeral therein, this being necessary in order to reset to normal position any of the racks 201 which may then be in "carry-over" position. During this extra or idle cycle, the stop-pin carriage 175 does not move to the left so that when slide actuating member 382 lifts pawl 386, the lower end of the latter is moved by spring 388 to a position above said carriage for engagement therewith to support member 382 in mid-position (full lines, Fig. 2) and thereby hold key lock slide bar 377 in its mid-position (Fig. 29). Total key 160 may then be depressed and locked in position by tooth 381 on the slide bar (Fig. 35) as described above.

The foot portion of total key 160 has a forwardly extending arm 393, the end of which overlies the end of a rearwardly extending horizontal arm of a pivoted bell crank 394 mounted on a fixed rod 396. The downwardly extending arm of said crank has a pawl 397 pivoted thereon and extending forwardly therefrom. Crank 394 is biased counter-clockwise against a stop-pin 398 and pawl 397 is biased counter-clockwise against a pin 399 by a single spring 400 connected between the rear end of pawl 397 and stop-pin 398. The lower face of said pawl is contoured to form a shoulder 401 that is adapted to engage pin 399 mounted on and projecting toward the right from the totalizer shift arm rocker or lever 336 that is pivotally mounted between spacer sleeves on the tie-rod 76 and biased clockwise by a spring 405 (Figs. 11 and 40). Clockwise movement of said lever 336 is limited by a rearwardly extending arm 402 thereof which engages the top of the sleeve 78 (Fig. 3).

Pivotally mounted on lever 336 at 403 is a dual function pawl 404, the free end of which extends to the left (Fig. 1) of the upper end of double rocker arm 319 and is normally biased upwardly by a spring 406 against pin 318 which projects to the left from the upper end of said rocker arm. Counter-clockwise pivotal movement imparted to lever 336 by forward movement of pawl 397 results in similar forward movement of pawl 404. On the upper surface of pawl 404 there is a forwardly facing shoulder 407 which is adapted to engage pin 318 and pivot rocker arm 319 counter-clockwise (Fig. 40). As pointed out above, this movement of the rocker arm 319 is effective through rod 318 and forked hook 311, 317 to move totalizer carriage 297 to its lowered or operative position (Fig. 40). Lever 336 also carries a pin 408 extending to the left therefrom (Fig. 1) and having a reduced eccentric end. During forward or counter-clockwise pivotal movement of lever 336, the large diameter portion of pin 408 engages the upper surface of pawl 321 and disengages it from the spacer on pin 318 between the plates of rocker arm 319. After pawl 404 has moved pin 318 forwardly to lower the totalizer frame, the reduced eccentric end of pin 408 also depresses said pawl 404 so that shoulder 407 thereon will be out of the path of pin 318. The same counter-clockwise movement of lever 336 carries pin 334 thereon downwardly and permits the free forward end of pawl 322 to drop or be moved counter-clockwise by spring 326 into hooked engagement with the spacer on pin 323 at the lower end of rocker arm 319.

A lock control slide 409 is mounted for limited fore and aft sliding movement on a headed stud 410 secured to frame plate 63 and on totalizer carriage actuating pin 318 (Fig. 11). The latter extends through a slot 411 in the slide, the upper rear end of which is slightly arcuately notched at 412 on the same radius as pin 318 to receive the latter. In normal operation, forward movement of slide 409 is prevented by pin 234 which, as described above, extends to the right through an oversize hole 414 in frame plate 63 from the right end ear 238 of the bail bar 237 that is actuated by cam 94 through the link 231 to lift slide rack locking pawls 220, 242 to non-locking position. For this purpose, slide 409 has at the rear end thereof an upwardly extending lug portion 413, the upper surface of which is in a plane immediately below pin 234 when the latter is in normal raised position (Fig. 11). Thus, when handle 67 and, hence, cam 94 are actuated, pin 234 is lowered to a position in front of lug portion 413 and prevents forward movement of slide 409 so that pin 318 can move in slot 411 relative to the slide.

The forward or left end of the slide 409 is biased downwardly by the spring 405 anchored to pin 334 on lever 336. Accordingly, when said lever is pivoted counter-clockwise by depression of total key 160 to lower said anchor pin 334, the spring 405 becomes sufficiently tensioned so that pin 318 will not ride out of notch 412 but will rather carry slide 409 forwardly with it. This forward movement of slide 409 brings the upwardly extending portion 413 at the rear end thereof to a position directly below pin 234. Thus, on the subsequent operating stroke of handle 67, slide portion 413 supports pin 234 and, hence, bail bar 237 in raised position and thus holds locking pawls 220, 242 in raised or inoperative position during the "total" printing cycle.

Intermediate the ends of slide 409 is an offset arcuately-shaped arm 416 which extends through frame 63 for operative engagement with a tab 417 projecting through an opening in gear frame plate 294 from the right hand end of a locking comb 418 (Figs. 1, 12 and 16). The latter extends transversely across and is pivotally mounted at its ends on tie rod 419 in the gear frame 294, 295 with upwardly extending hooked fingers 420 projecting below number wheels 302 between gears 291. When in raised position, the upwardly hooked ends of fingers 420 extend into the paths of pins 304 on the number wheels to thereby limit clockwise movement of the latter. Tab 417 extends into the concave upper surface of arm 416 so that, when slide 409 is moved forwardly in the manner described above, the tab rides up onto the rearward end of the arm 416 (Fig. 12) to raise comb fingers 420 (Figs. 1 and 16) into operative or locking position.

Thus, when the total key 160 is depressed (Fig. 35) by the operator, crank 394 turns clockwise, pawl 397 moves forwardly and, through its engagement with pin 399 on rock lever 336, pivots the latter counter-clockwise (Figs. 35 and 40), pin 408 moves pawl 321 out of hooked engagement with pin 318, and shoulder 407 on pawl 404 moves forwardly in engagement with pin 318 to lower the number wheel frame 297 and move lock control slide 409 forwardly to render rack locking pawls 220, 242 inoperative and number wheel locking comb 418, 420 operative, all in the manner above described. When pin 399 has been moved to its forward position, pin 408 has engaged pawl 404 and moved it out of the path of pin 318 and pawl 322 has been freed by the lowering of stop-pin 334 for movement by spring 326 into locking engagement with pin 323 on rocker arm 319 (Fig. 40).

When the operating handle 67 is now actuated, moving main operating rod 142 rearwardly, slide racks 200, 201 will move rearwardly and rotate gear assemblies 290, 291 counter-clockwise and thereby rotate number wheels 302, which are now in mesh with said assemblies in a clockwise direction. Each slide rack moves rearwardly until the pin 304 on the corresponding number wheel 302 engages a hooked finger 420 on locking comb 418. The distance moved by each slide rack 201 and the setting of the corresponding type-quadrant 218 thereby will depend upon the size or magnitude of the digit appearing in window 310 on the corresponding number wheel. Comb 418 will stop each number wheel and, hence, the corresponding slide rack 200, 201 and type-quadrant 218 of the printing mechanism when the zero on the wheel is opposite window 310, thus clearing the totalizer. With the type quadrants 218 thus set for printing the total, the hammers or cranks 254 are released and printing is effected in the manner previously described.

On the return stroke of the handle 67, while the total key is still depressed, pin 328 engages pawl 329 and moves slide member 324 forwardly in a manner heretofore fully described. Pawl 322, then in engagement with rocker arm pin 323, moves forwardly with slide 324 and pivots rocker arm 319 clockwise to thereby move pin 318 to the right for lifting the totalizer frame 297 and shifting lock control slide 409 toward the rear into inoperative position. This action occurs before slide racks 200, 201 start to return to their forward positions. Continued return movement of the handle 67 effects the return of the slide racks 200, 201 in the manner already described, and pawl 390 engages actuating member 382, 385 to pivot the latter clockwise into engagement with pin 380 and, hence, move key lock slide bar 377 rearwardly a sufficient distance so that locking tooth 381 is moved out of the path of the total key lug 376 and said key moves to raised position under the influence of a spring 171. Upon release of the total key in this manner, crank 394, pawl 397, lever 336 and pawls 321, 322 and 404 will return to normal position (Figs. 2 and 3) ready for the next computing cycle.

PRINTING A SUB TOTAL (*Figs. 1, 22, 29, 30, 36 and 41*)

The "sub total" key 161, which may be used by the operator to effect the printing of an intermediate or sub-total without clearing the visual totalizer, is controlled in precisely the same manner as the "total key" by lock slide 377, a lug 426 on the key 161 being adapted to co-operate with a tapered tooth 427 on the lock side in the same manner that lug 376 and tooth 381 cooperate (Figs. 30 and 36). The foot portion of key 161 has a laterally extending arm 421 which, when the key is depressed, actuates a bell crank 422 and pawl 423. Except for a tapered extension 424 on the pawl, said crank and pawl are constructed and mounted in the same manner as crank 394 and pawl 397 and are similarly biased by a spring 428. Pawl 423 engages the pin 399 and upon forward movement thereof effected by depression of key 161 said pawl performs the same function as pawl 397, i.e. the actuation of lever 336 and the pawl 404 to lower the totalizer frame 297 and set lock control slide 409 in operative position in the maner above described. However, during the final forward movement of pawl 423 and after pin 399 has been moved sufficiently far to the left or forwardly to accomplish the above functions, the tapered forward end 424 of the pawl rides up on the bar 121 (Figs. 1 and 36), thereby lifting pawl 423 and releasing pin 399. Lever 336 is thus released to move clockwise to its normal position under the bias of spring 405, thereby disengaging pawl 322 from pin 323 and permitting the outer end of pawl 321 to yieldably engage pin 318, all as viewed in Fig. 41.

When the operating handle 67 is now actuated, the slide racks 200, 201 move forwardly distances determined by the coaction of locking comb 418 and pins 304 on the number wheels 302 and the total then in the machine is printed in the same manner heretofore described. On the return stroke of the operating handle, the totalizer frame 297 remains in down position until after the slide racks 201 are returned to their forward or normal positions by bar 142 so that the number wheels 302 will be returned counterclockwise to position for again visually indicating the total in window 310. While this operation takes place, slide 324 is being moved forwardly by pin 328 engaging hook 329 in the manner heretofore described to carry pawl 321 into position for re-engagement with pin 318. At the very end of the return stroke, and after the total has been reset in the totalizer 297 by the return of racks 201, shoulder 338 on link 324 is engaged by pin 92 and moved rearwardly to effect the elevation of totalizer 297 and the return of lock control slide 409 to inoperative position through the linkage comprising pawl 321, pin 318 and arms 311, 312 as heretofore described. Sub total key 161 is also released by lock slide 377 near the end of the return stroke in the same manner as described for the release of total key 160, the slide being moved rearwardly by member 382 to move tooth 427 out of engagement with lug 426 on the key.

REPEAT MECHANISM

*(Figs. 1, 3, 6, 22 and 34)*

When it is desired to set the same number into the machine several times in succession for summation or listing, such as when multiplying or dividing one number by another, the result may be readily accomplished by depressing a repeat key 159. The shank of this key is provided with a notch 430 for cooperation with top plate 150 of the keyboard frame, whereby the key may be locked in depressed position if desired. An arm 431 extends laterally to the left (Fig. 22) from the shank of the repeat key for engagement in depressed position with a forwardly extending arm 432 on a vertically movable bar 433 which is biased upwardly by a spring 434 (Figs. 3 and 34). The upper end of said bar is slotted for engagement with a shouldered screw or stud 436 on frame member 63 and the lower end thereof is slotted to straddle tie-rod 131. An arm 437 extends to the right and forwardly from the lower end of bar 433 and over a tab 438 projecting to the left (Fig. 1) from carriage return link 91. The lower surface of arm 437 constitutes a cam surface for engagement by tab 438 to control the pivotal movement of link 91.

As pointed out above, link 91 when moved rearwardly on the return stroke of the operating handle 67 engages crank arm 197 to return the stop-pin carriage 175 to the right. When the repeat key and, hence, bar 433 with arms 432 and 437 are depressed, tab 438 engages the lower cam surface of arm 437 on rearward or return movement of link 91 and depresses the rear or right hand end of the latter so arm 144, 145 thereof will not engage bell-crank arm 197 for returning the stop-pin carriage 175 in the manner above described (Fig. 6). Accordingly, stop-pin carriage 175 is not returned to normal or right hand position, but will remain in actuated position so as to be operative during the next cycle in the same manner as if it had been returned to normal position and then reset to actuated position by again operating the digit keys to again set the same number in the machine. When the repeat key is not depressed, repeat bar 433 is held in raised position by spring 434 and does not interfere with the normal operation of carriage return link 91 as described above in connection with the operation of the stop-pin carriage.

NON-ADD MECHANISM

*(Figs. 1, 3, 22, 29, 30 and 37)*

When it is desired to list numbers on the tape without including the same in any computation being performed by the machine, this may be accomplished by depressing a non-add key 162 at the lower right corner of the keyboard to render the totalizer mechanism 297 inoperative while not interfering with the operation of the printing mechanism. The foot portion of said key comprises an arm 440 which extends forwardly, then to the left and then downwardly for engagement with an upwardly extending off-set arm 441 on pawl member 404 which is pivotally mounted at 403 on rock lever 336. Pawl 404 also has a tab 442 which extends laterally to the right (Fig. 1) for engagement with the upper surface of pawl or hook member 321. Thus, when non-add key 162 is depressed, pawl 404 is pivoted counter-clockwise so that tab 442 engages pawl 321 to move it out of hooked engagement with pin 318, thereby rendering it incapable of actuating rocker arm 319 and pin 318 to effect lowering of the totalizer frame in the manner heretofore described, and the parts assume the positions illustrated in Fig. 37 so that the totalizer frame will not be lowered to operating position during either the operating stroke or the return stroke of operating handle 67.

In order to relieve the operator of the necessity for holding the non-add key in depressed position, locking means are provided for this purpose. As shown, the shank of key 162 has a laterally extending lug 443 which overlies a bevelled tooth 444 on key lock slide 377. Thus, when key 162 is depressed, lug 443 engages the upper bevelled surface of tooth 444 to move slide 377 rearwardly against the effort of spring 379. After lug 443 has reached a position below the tooth, spring 379 moves the slide forwardly so that tooth 444 will overlie said lug and lock key 162 in depressed position. Said key is released in the same manner as keys 160 and 161 through actuation of slide 377 by member 382 and pawl 390.

NON-PRINT MECHANISM

*(Figs. 1, 17, 22 and 25)*

When the listing of one or more of the numbers set in the machine is not desired, the printing mechanism may be rendered inoperative, without affecting the operation of the totalizer mechanism, by depressing a non-print key 154 at the upper left corner of the keyboard. The shank or leg 446 of said key which extends downwardly through the lower plate 151 of the keyboard frame is adapted to engage and depress the forward end of an arm 447 which is part of link 268 and holds the latter out of position for engagement by pawl 263, 266. As heretofore described, said pawl normally engages link 268 to lift the same for pivoting locking comb 259 to inoperative position, thereby releasing cranks 254 for moving the type quadrants 218 to printing position. Accordingly, when link 268 is maintained out of engagement with pawl 263 the locking comb 259 will remain in locking position and the printing mechanism cannot operate. The shank of key 154 is provided with a notch 448 for locking the key in depressed position, if this is desired, during a plurality of successive operating cycles.

BACK SPACER MECHANISM

*(Figs. 1, 13, 15, 16, 22 and 24)*

In the event the operator makes an error in depressing the digit keys, he may as pointed out above remove the entire number set in the stop carriage by pulling the handle 67 part way down and releasing it. However, if he wishes to correct or remove only one or more of the last digits set in the machine, this may be effected by operation of a back spacer key 156. The foot portion of this key has an arm 450 which extends to the right (Figs. 22 and 24) and carries a pin 451 that engages a slot 452 in a forked arm 453 of a bail 454 pivotally mounted on a stud 456 projecting forwardly from bracket 457 secured to a spacer post 153 of the keyboard frame. Bail 454 has an arm 458 off-set toward the rear (Fig. 22) from forked arm 453 and extending downwardly to the left (Fig. 24) from pivot 456. A pawl 459 is pivoted intermediate its ends on arm 458 and both the bail 454 and said pawl are biased clockwise (Fig. 24) by a spring 460 connected between pawl 459 and a lug on the bracket 457. The left end of pawl 459 is reduced in thickness and the upper surface thereof cooperates with a downwardly projecting tab 461 on bottom frame plate 151 so that during initial counter-clockwise movement of bail 454 the right hand downwardly hooked nose of the pawl swings down (see dotted line position, Fig. 24) into a notch between teeth 193 of the escapement comb 192. As key 156 is pressed home, pawl 459 continues to move toward the right and the nose thereof engages a tooth 193 of said escapement comb and moves the stop-pin carriage 175 to the right. This movement of the carriage is sufficient to cause cam 186 (Fig. 13) to lift any depressed stop pins 181 in the adjacent row to the left thereof and to cause escapement pawl 189 (Fig. 15) to disengage one tooth of comb 192 and engage the next tooth to the left on said comb. Thus, when back spacer key 156 is depressed, the digit last set in the machine is cleared out and the stop-pin carriage is moved back one escapement step toward the right. The key may, of course, be actuated a second time to remove the second last digit entered in the machine and to move the stop-pin carriage back two spaces, and so on. This back spacing feature is a special convenience when the operator is executing a problem in division in the manner hereinafter disclosed.

In order to assist the operator in ascertaining the columnar position of the stop-pin carriage at all times, a pointer 462 is provided (Fig. 16). This pointer is mounted on and moves with carriage 175. The forward end thereof is pointed and terminates adjacent window 310 over and in alignment with number wheels 302.

SUBTRACTION (*Figs. 1, 4, 12, 17, 22, 25, 28, 44 and 45*)

The invention comprehends novel means in combination with the structure hereinabove described whereby direct subtraction of a number from the total then set in the machine may be effected. In the embodiment illustrated, said means comprises a subtraction key 158, the foot portion of which has a downwardly projecting leg 466 adapted to engage the upper surface of the bar 240 which is mounted and guided for limited vertical movement. Near its upper end bar 240 has a slot 467 through which rod 239 extends and the lower end thereof has a slot engaged by a fixed guide stud 468 (Figs. 17, 25 and 28). Spring 232 biases bar 240 upwardly to its top or normal position permitted by slot 467.

The lower end of bar 240 slides between frame plate 64 and the end arm 469 of a bail 470 which is mounted for angular as well as axial movement on the tie rod 257 between frame plates 63 and 64 (Fig. 45). Bail 470 is biased in an axial direction by a spring 471 to hold end arm 469 in engagement with bar 240. The central portion of the latter immediately above end arm 469 is off-set or bent away from frame plate 64. Thus, when subtract key 158 is depressed to push bar 240 downwardly, the lower off-set portion 472 thereof moves between end arm 469 and frame plate 64, thereby shifting bail 470 axially against spring 471. This movement of bail 470, brings an axially extending stud or roller 473, eccentrically mounted on the other end arm 474 of the bail, into the path of the cam 94 for operative engagement thereby.

A subtraction key locking pawl 476 is pivotally mounted on rod 239 between bar 240 and frame plate 64 and has a stud 477 extending into an oversize hole in said frame plate to limit angular movement thereof (Figs. 17 and 25). A ledge or shoulder 478 on the rear of pawl 476 is located in the path of subtraction key leg 466 to be engaged thereby during the last portion of the downward stroke of said key. The pawl 476 is thus pivoted clockwise (Fig. 17; counter-clockwise, Fig. 25) to cause the hook at the upper end thereof to engage or hook over the shank or foot of key 158 and secure the latter and bar 240 in depressed position and the bail 470 in shifted position with roller 473 in the path of cam 94.

With the parts thus positioned by depression of the subtraction key and the number to be subtracted set in the stop-pin carriage, the initial movement of the operating handle 67 rotates cam 94 counter-clockwise (Figs. 12 and 44) to lift roller 473 and pivot bail 470 clockwise about rod 257. The forward end 480 of the cross bar of said bail is thus raised and engages the bottom of gear assembly frame 294, 295 near the rear edge thereof to lift said frame as permitted by the slots in said frame which straddle bars 76 and 202. This movement of said frame lifts pinions 290 out of engagement or mesh with the lower toothed arms 207 on the slide racks 201 and into mesh with the upper toothed arms 208. At the same time, an over-balanced lock releasing pawl 481, which is pivotally mounted on side plate 295 of the gear assembly frame, is lifted and the hooked end 482 thereof pivots by gravity into overlapping relation with an upwardly-facing, forwardly-extending shoulder or hook 483 on key lock pawl 476 (Figs. 17 and 25). Releasing pawl 481 has a weighted arm 484 to effect pivotal movement thereof, said arm being adapted to engage link 364 when frame 294, 295 is in lowered position.

On continued movement of handle 67, all of the parts function just as heretofore described for accumulation (addition), except that when slide racks 201 are returned forwardly from the positions determined by stops 181 on the stop-pin carriage 175, the gear assemblies 290, 291, then in mesh with toothed arms 208, will be rotated counter-clockwise and, hence, rotate number wheels 302 in a clockwise direction. This movement of the number wheels, which is the reverse of the movement thereof during accumulation (addition), will effect a reduction of the total previously accumulated in the totalizer and appearing in window 310, the reduction being in an amount equal to the number set in the machine through the keyboard at the beginning of the subtraction cycle.

If the number appearing in window 310 on any given number wheel reverts from 0 to 9 during a subtraction cycle, the pin 304 thereon will engage hump 359 on pawl 358 to actuate it and the associated pawls 348 and 342 of the "carry-over" mechanism. The slide rack to the left of said given number wheel will accordingly be permitted to move forwardly an extra distance (one tooth) sufficient to reduce by one the number which would otherwise be visible on the next number wheel to the left.

At the end of each subtraction cycle, cam 94 returns with handle 67 to normal position and thereby permits gear assembly frame 294, 295 to drop to its down position. On downward movement of release pawl 481 with said frame, the same engages shoulder 483 on pawl 476 and pivots the latter out of locking engagement with the shank or foot 465 of subtraction key 158. This releases the key and, hence, bar 240 and bail 470 for return movement to normal position under the influence of the biasing springs 232 and 471 connected therewith. Further downward movement of pawl 481 brings the weight arm 484 thereof into engagement with the upper surface of link 364 and pivots said pawl out of locking engagement with pawl 476.

DIVISION (*Figs. 22, 25 and 27*)

The direct mechanical subtraction feature of the present machine makes it easy for the operator to effect accurate and speedy calculations in division. For this purpose, there is provided a division key 157 (Fig. 27), the shank of which has a notch 486 whereby the key may be locked in depressed position in a known manner. The foot of said key comprises a downwardly extending leg 487 that engages the upper end of the same bar 240 which is actuated by the subtraction key 158. However, the ledge 478 of locking pawl 476 does not extend into the path of the division key and, hence, said pawl remains in non-locking position when the division key is depressed. Accordingly, the depression of the division key has precisely the same effect upon the machine and its operation as does the depression of the subtraction key, except that the division key, when locked by means of notch 486, remains locked in depressed position until released by the operator. For the purpose of obtaining the printing of a proper symbol (in a manner to be subsequently described) when dividing or subtracting, the subtraction key 158 depresses bar 240 slightly further than does division key 157.

To effect a computation in division, the dividend or number to be divided is entered in the totalizer of the machine. The division key 157 and repeat key 159 are then locked in depressed position and the divisor is set in the stop-pin carriage, and enough zeros are added thereto to make a "temporary" divisor which is as large as possible and yet divisible into the dividend. If desired, the division key may be provided with an additional arm (not shown) which will actuate member 432, 433 downwardly (Fig. 3) and, hence, eliminate the necessity for depressing repeat key 159 during execution of a problem in division. Handle 67 is then actuated as many times as may be necessary until the total remaining in the visual totalizer is less than the "temporary" divisor. The latter is then reduced in size by depressing the back spacer key 156 to remove the last zero from the "temporary" divisor then set in the machine, and the process is repeated again and again until the total remaining in the visual totalizer is less than the actual divisor. The remaining total is then printed. The quotient is then determined by setting down in series the number of times each temporary divisor and the actual divisor were subtracted from the remaining total. For example, in dividing 2575 by 12 the following figures would appear on the tape:

```
2575   dividend
1200   1st "temporary" divisor
1200
 120   2nd "temporary" divisor
  12   actual divisor
  12
  12
  12
   7   remainder
```

It will be seen that the first temporary divisor 1200 was subtracted two times. Temporary divisor 120 was subtracted one time and the actual divisor 12 was subtracted four times, leaving a remainder of 7. Hence, the quotient is 214 with 7 remainder. The quotient will contain a zero whenever a temporary or actual divisor cannot be subtracted at least once in performance of the above described process.

SYMBOL CONTROL

*(Figs. 1, 12, 16, 17, 22, 26, 27, 28, 31, 32, 33, 38 and 39)*

In order to assist the operator in identifying the figures and calculations on the list printed on tape 488, novel means are provided for controlling and effecting the printing of symbols on the tape following the numerals to indicate totals (*), subtotals (ST), numbers not added (#), numbers subtracted (—), and numbers subtracted in making a calculation in division (÷). The printing of the above indicating symbols is effected by the symbol type-quadrant 250 which is like the digit type-quadrants 218 and is operated, guided and controlled in like manner by like parts, except that the symbol slide rack 500, 501 (foreground, Fig. 16) and the stops for determining the rearward movement of said rack differ from digit slide racks 200, 201 (Figs. 5 and 42; background Fig. 16) and the stop means therefor in a manner to be next described. A further exception is that the locking detent 222 associated with symbol rack 500, 501 is not interlocked or overlapped with the adjacent detent 222 to the left thereof in the manner that said detents associated with racks 200, 201 are interlocked by arms 279 as described above (Figs. 19–21).

The symbol slide rack 500, 501 may be made up by fastening together with rivets 502 or the like two of the slides 200 and 201 used in fabricating the digit slide racks, thereby making it unnecessary to use a spring 211 on the symbol rack. The toothed furcations at the forward or tabulating end of the rack 500, 501 are cut short, as seen in Fig. 16, to terminate at 503 and the upwardly extending shoulder 213 is removed to prevent interference with the rearward or right hand movement of the symbol rack slide 501. Integral with slide 501 is a tab 504 which engages a stepped stop arm 506 (Figs. 12 and 39) to variably limit the rearward movement of the symbol rack and determine the pre-printing position to which the symbol type-quadrant 250 is moved by said rack. Stop arm 506 is pivotally mounted on a fixed axis 507 and has an upwardly extending arm 508 which has pivotal connection with a longitudinally extending bar 509. The latter is biased forwardly and arm 506 is biased counter-clockwise by a spring 510.

The forward end of bar 509 is pivotally connected at 511 to the lower end of a lever 512 that is in turn pivotally mounted on rod 239 and extends upwardly therefrom (Fig. 39). Also pivotally mounted on rod 239 is an arm 513, the upper end of which has a tab 514 extending to the left (Figs. 12 and 26) for engagement with the rear edge of the upper rounded edge of lever 512. A pin 516 mounted on lever or arm 513 and extending laterally toward the right from the upper end thereof is adapted to fit into a downwardly facing open slot 517 in the lower edge of a symbol selector bar 518 (Fig. 31). The latter comprises a straight bar portion slidably mounted on the pins 378 between key lock slide 377 and frame posts 152, 152 and a rearwardly bent portion 519 in the lower edge of which pin groove 517 is formed and to which a biasing spring 520 is connected (Fig. 22).

The upper edge of slide or bar 518 is grooved or slotted below each of the total, sub-total and non-add keys and the forward edges of said grooves are tapered to cooperate with the same tabs on said keys which cooperate with the locking teeth 381, 427 and 444 on key lock slide 377 as heretofore described. Said cooperating tapered surfaces on slide 518 are of different extents so that the non-add key 162, when depressed, will cam the slide 518 forwardly only a short distance, sub-total key 161 will move it a slightly greater distance in the same direction, and the total key 160 will move it a still greater distance forwardly. These movements of slide 518, the amount depending upon which key is depressed, are transmitted through pin 516 to impart counter-clockwise movement to arm 513. Lug or tab 514 on the latter engages the upper rounded end of lever 512 and accordingly pivots it counter-clockwise to thereby move bar 509 rearwardly and pivot the stepped stop arm 506 of crank 506, 508 in a clockwise direction.

The uppermost forward tip of arm 506 is engaged by tab 504 and serves to limit the rearward movement of symbol rack 500, 501 when no symbol is to be printed (Figs. 12 and 31). When the non-add key 162 is depressed (Fig. 38), arm 506 is pivoted sufficiently to bring the first (from the top) step or shoulder thereof into the path of tab 504 to thereby permit symbol rack 500, 501 to move further to the rear for lifting the symbol type quadrant 250 a sufficient amount to print the non-add symbol (#). Depression of the sub-total key 161 (Fig. 33) moves the next lower or second step of the arm 506 into operative position, and depression of the total key 160 (Fig. 32) lifts said arm still more to bring the third step into operative position and permit corresponding greater rearward movements of symbol slide rack 500, 501 to effect proper positioning of the symbol type quadrant 250 to print the sub-total (ST) and total (*) symbols, respectively.

Further clockwise movement of stop arm 506 to bring the fourth and fifth steps thereof into operative position is effected by depression of the division and subtraction keys, respectively, through the medium of a bail 521 pivotally mounted on rocker shaft 139. The left end arm 522 of said bail has a forwardly extending tapered portion (Figs. 16, 27 and 28) which engages the upper surface of a V-shaped notch 523 in the upper rear edge of bar 240 which is moved downwardly different distances by depression of the division and subtraction keys as heretofore described. Downward movement of bar 240 depresses end arm 522 and effects clockwise (Fig.

17) pivotal movement of bail 521. The right hand end arm 524 of said bail is shaped to engage a laterally extending pin 526 mounted on lever 512 forwardly and upwardly from pivot bar 239 (Figs. 12 and 39). As the bail turns clockwise, it will effect counter-clockwise movement of lever 512, rearward movement of bar 509 and clockwise movement of stepped stop arm 506 to position the fourth and fifth (from the top) steps thereof in operating position to stop rack 500, 501, the position depending upon whether the division key 157 or the subtraction key 158 is depressed. Arm 524 of bail 521 has a rearward projection 527 which moves downwardly into the path of tab 514 on arm 513, thereby preventing forward movement of symbol slide bar 518, 519 and, hence, preventing depression of the non-add, sub-total, and total keys when either the division key or subtraction key is depressed.

PLATEN, RIBBON-FEED AND PAPER-FEED ASSEMBLY (Figs. 1, 3, 12, 16, 17, 39 and 46 to 51)

Novelly combined with the above described apparatus is a platen assembly embodying novel means for feeding an inked ribbon and for locking the platen against movement during the printing operation. In the illustrated embodiment, said assembly comprises a frame consisting primarily of side plates 530 and 531, a front end plate 532 and a bottom plate 533, all suitably rigidly secured together by screws or the like and adapted to be removably secured to the rear edges of frame plates 61 and 62 (Figs. 46 to 51). The shaft of the platen 272 having a rubber or other suitable surface is journalled in side plates 530, 531 and has a ratchet wheel 534 mounted thereon for rotation therewith.

Pivotally mounted on the hub of ratchet wheel 534 is a pawl carrier 536 that extends downwardly and pivotally connects with a link 537, the forward end of which extends through plate 532 and is pivotally connected to crank arm 134 by an eccentric pin 538 (Fig. 3). Pivoted on a stud 539 on lever 536 is a ratchet pawl 540 that is biased by a spring 541 toward operative engagement with ratchet wheel 534. The lower edge of pawl 540 has a shoulder 542 adapted to engage a pin or stud 543 on frame plate 530 to effect counter-clockwise movement of the pawl and, hence, disengagement thereof from wheel 534 at the end of the forward movement of the pawl. The platen 272 is thus freed for rotary movement in either direction by handles 544, 545 on the ends of the platen shaft, but such movement is yieldably resisted by an indexing arm assembly comprising a pivoted arm 546 and a roller 547 mounted thereon and held in engagement with ratchet wheel 534 by a spring 548. The lower end 549 of arm 546 extends into the path of lever 536 for engagement thereby at the very end of the rearward stroke of said lever. A counter-clockwise force or torque is thus applied to arm 546 by lever 536 to firmly press roller 547 into engagement with ratchet wheel 534 and hold platen 272 firmly against movement when the type quadrants 218, 250 strike the same.

Thus, on each operating stroke of handle 67, the crank 134 is actuated in the manner fully described above and moves link 537, the lower end of arm 536 and pawl 540 to the right or toward the rear. Pawl 540, as it moves away from pin 543, is pivoted by spring 541 into engagement with ratchet wheel 534 and lever 536 presses against the lower end 549 of arm 546 to urge roller 547 into firm engagement with said wheel. On the return stroke, pawl 540 is effective to index the platen one tooth of the ratchet and thereafter shoulder 542 thereon engages stud 543 to effect disengagement of the pawl from the ratchet wheel. This is repeated during each cycle of operation of the machine.

Paper tape 488 from a roll 550 is fed between platen 272 and a curved guide 551, the latter of which is transversely slotted to permit a pressure roller 552 to press the paper strip against the platen. Roller 552 is rotatably journalled on spaced arms 553 pivoted on a bar 554 and biased clockwise by a spring 556. As the platen is indexed by pawl 540 or manually, the paper strip is fed around the platen. A pivoted bail 557 is provided for temporarily moving pressure roll 552 away from platen 272 to permit free movement of paper strip 488 by hand.

An inked ribbon 558 is indexed or fed from one spool 559 to another spool 560, the same being guided and supported to extend across the front face of platen 272 by a vertically movable ribbon guide plate 561. Each spool 559, 560 is removably mounted on the outer end of one of two coaxial shafts 562, 562 for rotation therewith, the driving connections shown comprising radially slotted washers 563 staked on the shafts for cooperation with lugs 564 on the spools. A spring hook 566 on the spool coacts with a groove in the shaft to hold the spool against axial removal. Spool shafts 562 are journalled in coaxial bearings 567 supported by side plates 530 and 531 and have ratchet wheels 568, 568 mounted on the adjacent end portions thereof for rotation therewith.

Novel means are provided for controlling and actuating ratchet wheels 568 alternately to feed ribbon 558 back and forth between the right and left hand spools 559, 560. In the specific form herein shown, said means comprises a bail, the end arms 570, 571 of which are pivoted on bearings 567. Extending rearwardly from the center of the cross-bar 572 of said bail and between ratchet wheels 568, 568 is an arm 573 that terminates in two upturned ears 574, 574. Pivotally mounted on each ear 574 and adjacent a ratchet wheel 568 is an operating pawl 576 with a rearwardly extending nose 577. A lug 578 on the forward end of each operating pawl 576 extends laterally over the adjacent ratchet wheel 568 and beneath a locking pawl 579 pivoted on a rod 580 and also adapted to operatively engage a ratchet wheel 568. Each pawl 579 is biased clockwise (Fig. 47) and toward a ratchet wheel 568 by a spring 581 connected to the cross-bar of bail 557 and each said pawl has a tab 582 extending laterally from the top edge thereof and over the operating pawl 576 adjacent thereto.

The outer or rear end 583 of the center arm 573 on bail 572 is bent downwardly and has a transversely-extending double ended lever 584 pivotally mounted thereon by means of a headed pin 586. Upward movement of the opposed ends of lever or arm 584 is limited by pointed rearward projections 587 of ears 574 and said lever is yieldably held in one or the other of its limiting positions by a leaf spring 588 mounted on arm 573. For this purpose the rear end of the spring 588 has a cone-shaped projection 589 on the lower surface thereof for cooperation with an inverted V-shaped hump on the central upper edge of lever 584. The nose portions 577 of pawls 576 extend into the paths of the ends of said lever 584 so that when an end of the latter is depressed, it will pivot a pawl 576, 577 clockwise to thereby lift the lug 578 on the pawl out of engagement with its associated ratchet wheel and into engagement with a locking pawl 579 to lift the latter away from the ratchet wheel. It will thus be seen that lever 584 is effective to hold either set of pawls 576, 579 in inoperative position while the other set is biased to operative position by a spring 581 and gravity.

Figure 47:
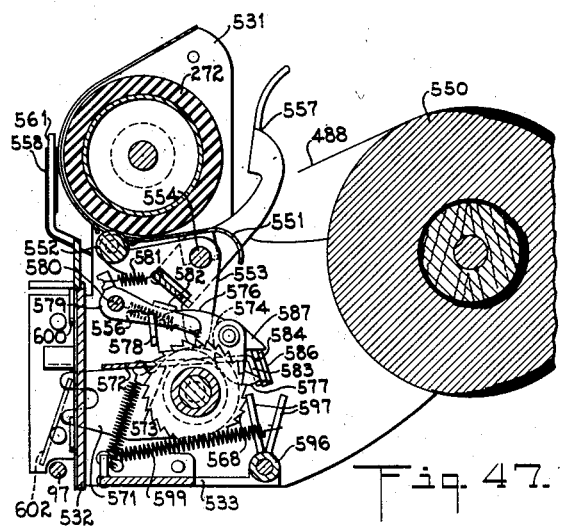
Fig. 47 is a vertical side sectional view of the unit shown in Fig. 46, the section being taken substantially on line 47—47 of Fig. 51.

Actuation of pawl sets 576, 579 is effected through bail 572, the left hand end arm 571 of which, as viewed from the left in Fig. 47, has a forked extension (Fig. 47) that projects forwardly through frame plate 532 for operative engagement with a pin 590 (Figs. 16 and 17) carried by the left hand end arm 591 of a bail 592 which is pivotally mounted on tie-rod 131. Said bail also comprises a right hand end arm 593 (Figs. 1, 12 and 39) connected with arm 591 by a cross-bar 594. The lower edges of bail arms 591 and 593 extend rearwardly and downwardly across the path of transverse rod 143 that connects the rear ends of links 140, 141. Accordingly, as the latter are moved rearwardly with rod 143 in the manner herein previously described, rod 143 will engage arms 591, 593 and pivot the same counter-clockwise (Figs. 12 and 17) to thereby lift pin 590 and pivot bail 572 clockwise.

Clockwise movement of bail 572, 573 is effective to carry operating pawls 576 rearwardly. The pawl 576 which is then in operative position will index the ratchet wheel 568 engaged by lug 578 on the pawl and, hence, index said wheel and the ribbon spool connected therewith in a clockwise direction (Fig. 47). This movement of one spool will pull the ribbon 558 from the other spool. Thus, during successive cycles of operation of the machine, the ribbon is indexed from one spool to the other, the direction depending upon which set of pawls 576, 579 is in operative position. Pawls 579 are operative to prevent reverse or counter-clockwise movement of the ratchet wheels 568.

Figure 50:
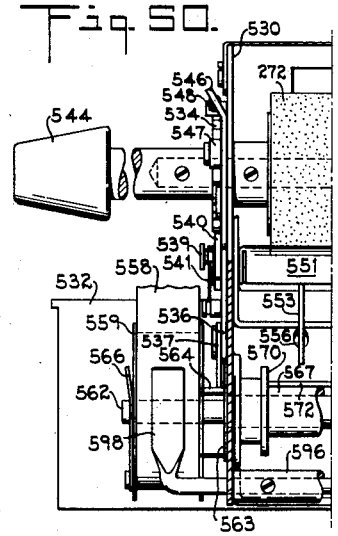
Figs. 50 and 51 are complementary rear elevational views, partly in section and with the paper supply roll removed, Fig. 50 showing elements illustrated in Fig. 46 and Fig. 51 showing elements illustrated in Fig. 47.
Figure 51:
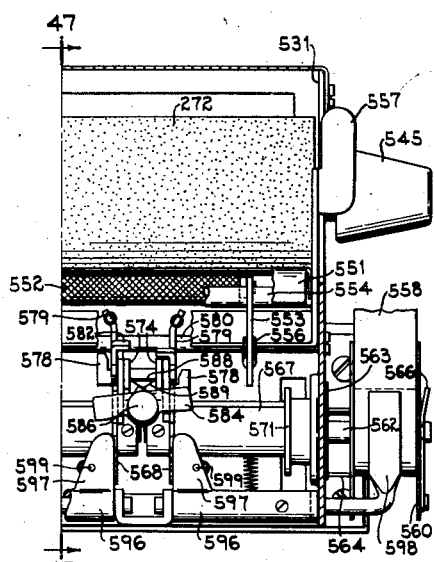
Figure 49:
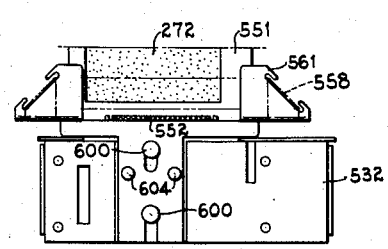
Fig. 49 is a fragmentary front elevational view of said unit, on a reduced scale, as viewed from the left in Figs. 46 and 47.
Figure 48:
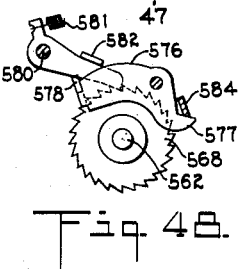
Fig. 48 is a detail side elevational view, partly in section, of a portion of the ribbon feed mechanism.

Means are provided for automatically actuating lever 584 for reversing the direction of travel of the ribbon 558 when most of it has been accumulated on one of the spools therefor. Said means comprises a pivotally mounted U-shaped member 596 having vertically projecting end arms 597 and 598. There is one U-shaped member or rocker 596 at each side of the platen frame (Figs. 50 and 51). Feeler arm 598 is biased by a spring 599 into engagement with the surface of the ribbon in one of the spools 559, 560. Arm 597 is mounted to move into the path of the adjacent end of lever 584 when the ribbon on the spool associated therewith is substantially depleted and said lever is moved forwardly and downwardly by pivotal movement of bail arm 573, 583. Thus, as the ribbon is fed onto one spool by the operation of one set of pawls 576, 579, the upper end of arm 598 therein moves toward the rear and carries its associated arm 597 with it and out of the path of lever 584. When the ribbon on the other spool has been depleted to a predetermined minimum, arm 597 of the rocker 596 associated with said other will have been moved forwardly by spring 599 into the path of lever 584 for engagement by the depressed end of said lever during an indexing stroke, i.e. during downward movement of the lever with arm 573, 583. Such engagement will cause the lever 584 to pivot to its other limiting position under control of spring 588. The parts will thus be rendered operative to pull the ribbon back to the empty spool during successive operating cycles of the machine. When this spool fills up the control lever 584 is again actuated by the other member 597 to again reverse the direction of ribbon feed in the same manner. In the drawings, the left end of lever 584 (Fig. 51) is in depressed position so that the parts are operative to feed ribbon from the left spool (Fig. 50) to the right spool (Fig. 51). This operation will be reversed when arm 597 of the left rocker 596 (Figs. 50 and 51) moves forwardly and below the depressed end of said lever 584 to cause the latter to flip to its other position as it moves bodily downward with the rear end of bail arm 573 when the latter is actuated by bail 571, 572.

The ribbon 558 is preferably a dual color ribbon, such as one having the upper half black and the lower half red. When such a ribbon is used means are provided for utilizing different colored printing to facilitate interpretation or reading of the numbers listed on tape 488. The present embodiment contemplates printing in red, the totals, sub-totals, numbers subtracted for executing problems in subtraction or division, and the identifying symbols therefor. For this purpose, ribbon guide plate 561 is mounted for limited vertical movement on two pins 600, projecting forwardly from the rear plate 532 of the platen frame. When the guide plate is in normal position, the type strips 253 will strike the upper or black half of the ribbon and when the guide plate is lifted with the ribbon, the type strips will engage the lower or red half thereof.

The position of guide plate 561 and, hence, of the ribbon at the instant that printing takes place is controlled by the same means which controls the position of the symbol rack stop arm 506 (Fig. 39). The link 509 which actuates said arm extends rearwardly therefrom and terminates in a portion having a vertical slot 601 therein. A bail having a transverse cross-bar or plate 602 is pivotally mounted on rod 594 which connects the rear ends of bail arms 591 and 593. Projecting transversely from an ear on plate 602 is a pin 603 which extends into slot 601. It will be seen that as the rear ends of arms 591 and 593 are lifted by rearward movement of rod 143, as described above, plate 602 will be moved vertically and the path of the upper edge thereof will be determined by pin 603 moving in slot 601. Accordingly, as link 509 is moved further toward the right (Figs. 12 and 39), the vertical path of the upper edge of plate 602 will also move to the right. Said upper edge, when moved sufficiently toward the rear, i.e. to the right, will engage two studs 604 (Figs. 39, 47 and 49) projecting forwardly from guide plate 561 and, hence, lift the latter to bring the red half of ribbon 558 into printing position. This occurs when the total key, sub-total key, subtract key or division key is depressed to move link 509 and, hence, the upper edge of plate 602 toward the rear. When in a forward position (Fig. 12), plate 602 will clear the forward end of studs 604 and leave the black half of the ribbon in printing position.

There is thus provided an extremely compact and versatile calculating and printing machine wherein a relative small number of parts have been assembled in various novel combinations which function in novel combination with each other. The various elements of the machine are designed and assembled with a view to facilitating assembly as well as inspection and repair of the machine. Additionally, said machine embodies novel means for preventing damage to the operating parts or erroneous results which often occur in other machines of the same type due to improper and injudicious operation. The machine is small and readily portable, it is capable of performing a wide variety of mathematical calculations and is adapted for operation by an inexperienced operator without extensive instruction. The parts of the machine may be readily and inexpensively manufactured and assembled by known manufacturing processes.

In the foregoing specification and in the claims which follow, the terms used for describing the direction of the movements and the relative locations of the various parts of the machine and the movements thereof, should be broadly construed, the specific terms used herein having been selected in the interest of clarity and ease of understanding. For example, the terms "upper," "lower," "forward" and "rearward" as used in the claims should be construed merely as identifying different relative locations or directions of movement. Likewise, it will be understood that the terms used in identifying and distinguishing many of the parts and sub-assemblies of the machine may be equally as well known in the art by other terms.

Although only a single embodiment of the invention has been illustrated and described, it is to be expressly understood that the invention is not limited thereto but that various changes, particularly in the design and arrangement of the parts shown, may be made without departing from the spirit and scope of the invention as it will now be understood by those skilled in the art.

What is claimed is:

1. In a calculating machine, totalizing means, means including racks for actuating said totalizing means, carry-over means operably associated with said totalizing means and including releasable stops for said racks, means for restoring said stops from released to operative position including an extensible linkage comprising two longitudinally overlapping links and resilient means for normally maintaining said linkage in contracted condition, said resilient means being sufficiently strong to transmit the power normally required for restoring said stops, and actuating means including a member directly engageable with but not connected to said linkage to move the same in one direction only to restore said stops and directly engageable with said racks to move the latter in the other direction.

2. Apparatus as defined in claim 1 comprising resilient means resisting movement of said racks and linkage by said actuating means.

3. In a calculating machine, a slide rack assembly comprising first and second slides and means for connecting said slides together for limited linear longitudinal movement relative to each other, resilient means for yieldably connecting said slides and tending to hold the assembly in extended condition, said first slide having a longitudinally extending slot therein and a toothed extension at the forward end thereof for operative connection with totalizing means and said second slide having gear teeth on the rear upper edge thereof for operative connection with printing means, means for supporting and guiding said slide rack assembly comprising spaced rods having axially spaced grooves for receiving the opposed edges of said first slide and grooved means for receiving the opposed edges of the longitudinally extending slot in said first slide.

4. Apparatus as defined in claim 3 comprising totalizing means operatively connected with said first slide, printing means operatively connected with said second slide, means for normally maintaining said slides in a predetermined position in contracted condition against the efforts of said resilient means, and means for locking said first slide against rearward movement from said predetermined position while releasing said second slide for rearward movement by said resilient means, the extent of said movement being determined by said connecting means.

5. Apparatus as defined in claim 3 comprising totalizing means operatively connected with said first slide, and means for normally maintaining said slides in a predetermined position in contracted condition against the efforts of said resilient means.

6. In a calculating machine, a plurality of movable slide rack assemblies each comprising a pair of first and second slides, each of said first slides having a longitudinally extending slot therein, means slidably supporting said assemblies for linear longitudinal movement, means for securing said pairs of slides together for limited longitudinal movement relative to each other, resilient means connecting each pair of slides for yieldably urging said first slide forwardly and said second slide rearwardly relative to each other to the limited extent permitted by said securing means, totalizing means, printing means, means operatively connecting said first slides to said totalizing means, and means operatively connecting said second slides to said printing means, said rack assembly supporting means comprising spaced rods having axially spaced grooves for receiving the opposed edges of said first slides and grooved means for receiving the opposed edges of the longitudinally extending slots in said first slides.

7. Apparatus as defined in claim 6 wherein said securing means comprises a plurality of headed studs on one slide of each pair engaging elongated slots in the other slide of said pair, said elongated slots and studs determining the limits of said relative longitudinal movement of the slides of each pair and constituting the sole support and guide means for the second slide of each pair.

8. In a calculating machine, a plurality of movable slide rack assemblies each comprising a pair of first and second slides, means for securing said pair of slides together for limited longitudinal movement relative to each other and resilient means connecting said pair of slides for yieldably urging said first slide forwardly and said second slide rearwardly relative to each other to the limited extent permitted by said securing means, means slidably supporting said assemblies for linear longitudinal movement, totalizing means, printing means, means operatively connecting said first slides to said totalizing means, means operatively connecting said second slides to said printing means, spring means under tension connected to each of said second slides for urging said assemblies rearwardly, actuating means for moving said assemblies forwardly simultaneously against the efforts of said spring means to a predetermined normal position in alignment with each other and with the slides of each assembly in contracted condition, means for releasably locking each of said first slides against rearward movement from said normal position independently of said actuating means, said locking means comprising a pivoted pawl for each of said first slides, a transversely movable stop-pin carriage for selectively controlling the rearward movements of said slide rack assemblies by said spring means when the same are released by said actuating means and said locking means, and resilient means biasing each said pawl toward locking position, each said pawl having an arm engageable with said carriage to hold the pawl in non-locking position when the carriage is in the path of said arm.

9. Apparatus as defined in claim 8 comprising means for holding all said locking pawls in non-locking position during movement of said carriage.

10. Apparatus as defined in claim 9 comprising stop pins in said carriage, tensioned resilient means urging said carriage into the paths of said pawl arms, an escapement device for effecting step-by-step movement of said carriage by said last-named resilient means, and a keyboard assembly removably mounted independently of said escapement device and including keys for selectively moving the stop pins in said carriage to operative position and for simultaneously operating said escapement device to index said carriage.

11. In a calculating machine, a stationary frame, totalizing means including a gear frame mounted on said stationary frame for limited linear bodily movement relative thereto, a plurality of gear assemblies rotatably mounted on a common shaft in said gear frame, a number wheel frame mounted on said gear frame for movement therewith and pivotal movement relative thereto, a plurality of number wheel assemblies rotatably mounted on a common shaft in said number wheel frame, each said wheel assembly including a pinion adapted to mesh with a said gear assembly, a plurality of racks mounted on said stationary frame and meshing with said gear assemblies for actuating said totalizing means, means for actuating said racks and said number wheel frame in timed relation, each of said racks being mounted for linear movement at right angles to the direction of movement of said gear frame and having spaced arms with gear teeth thereon for selective engagement by a said gear assembly when the gear frame is in its limiting positions, and a single carry-over means operatively associated with said totalizing means and being operable when the gear frame is in mesh with either set of corresponding arms on said racks.

12. Apparatus as defined in claim 11 wherein said carryover means comprises a releasable stop for each of said racks mounted on said stationary frame, locking means for each of said stops mounted on said stationary frame and a releasing pawl operatively associated with each of said locking means, said pawls being mounted on said gear frame and operable by said number wheel assemblies.

13. In a calculating machine, a stationary frame, a plurality of linearly movable slides mounted in said frame, means for selectively controlling the movements of said slides, each of said slides having spaced projecting arms with gear teeth on the adjacent edges thereof, and a totalizing unit mounted on said frame for limited linear movement at right angles to the direction of movement of said slides, said unit including gear assemblies mounted for rotation independently of each other and for selective engagement with the gear teeth on either set of corresponding arms on said slides and a plurality of number wheel assemblies having gears thereon movable into and out of meshing engagement with said gear assemblies.

14. Apparatus as defined in claim 13 wherein the gear assemblies are mounted for relative rotation on a common shaft and including a single carry-over control means including parts mounted on said stationary frame and operable by said number wheel assemblies, said carry-over control means being operable when said unit is in either of its limiting positions.

15. In apparatus of the class described, a stationary frame, a plurality of slide rack assemblies mounted on said frame for linear longitudinal movement, each said assembly comprising a pair of slides consisting of a first slide and a second slide, means for securing the slides of each pair together for limited longitudinal movement relative to each other, means for resiliently connecting the slides of each pair and tending to urge each of said assemblies to extended condition, means for actuating and normally holding said assemblies in a predetermined position and in contracted condition, releasable stop means for limiting forward movement of each of said first slides, totalizing means including rotatable pinions continuously operatively connected with said first slides during each computing cycle, means controlled by said totalizing means for selectively releasing one or more of said stop means to permit forward movement of the first slides controlled thereby to the limited extent permitted by said securing means, each of said first slides being a rigid unitary member bifurcated at the forward end thereof and the adjacent inner edges of the furcations having gear teeth thereon, and means for moving said rotatable pinions of the totalizing means into selective engagement with one or the other sets of corresponding furcations on said first slides.

16. In apparatus of the class described, a stationary frame, a plurality of slide rack assemblies mounted on said frame for linear longitudinal movement, each said assembly comprising a pair of slides consisting of a first slide and a second slide and each of said first slides being a rigid unitary member bifurcated at the forward end thereof and the adjacent inner edges of the furcations having gear teeth thereon, means for securing said slides of each pair together for limited longitudinal movement relative to each other, means for resiliently connecting the slides of each pair and tending to urge each of said assemblies to extended condition, means for actuating and normally holding said assemblies in a predetermined position and in contracted condition, releasable stop means for limiting forward movement of each of said first slides, totalizing means operatively connected with said first slides, said totalizing means including a linearly movable gear frame, a plurality of gear assemblies mounted in said gear frame for independent rotary movement about a common axis, each gear assembly being adapted to mesh with teeth on either one of the furcations of one of said first slides, a number wheel frame pivotally mounted on said gear frame and a plurality of number wheel assemblies mounted on said number wheel frame for independent rotary movement about a common axis, each of said number wheel assemblies comprising a pinion, means for pivotally actuating said number wheel frame to move said pinions into and out of mesh with said gear assemblies, means controlled by said totalizing means for selectively releasing one or more of said stop means to permit forward movement of the first slides controlled thereby to the limited extent permitted by said securing means, and means for moving the totalizing means into selective engagement with one or the other sets of corresponding furcations on said first slides.

17. Apparatus as defined in claim 16 wherein each of said gear assemblies comprises a gear adapted to mesh with one or the other of said furcations on one of said bifurcated slides and a larger gear adapted to mesh with one of said pinions.

18. In a calculating machine, a stationary frame, a totalizing unit mounted on said frame for linear movement relative thereto between limiting positions, said unit including a gear frame, a plurality of rotatable gear assemblies rotatably mounted in said gear frame, a number wheel frame pivotally mounted on said gear frame and a plurality of number wheel assemblies rotatably mounted in said number wheel frame, each of said number wheel assemblies including a pinion adapted to be moved into and out of mesh with a said gear assembly, a plurality of slides slidably mounted in said stationary frame, each said slide having two toothed racks thereon selectively engageable by a said gear assembly when the gear frame is in its limiting positions, and means for controlling and effecting reciprocating movement of said slides, said means comprising a pivoted stop for normally limiting movement of each of said slides in one direction, a locking pawl for releasably locking each of said stops in operative position, said stops and pawls being mounted independently of said gear and number wheel frames, and releasing means mounted on said gear frame and operable by said number wheel assemblies for selectively releasing one or more of said stops.

19. Apparatus as defined in claim 18 wherein said releasing means includes a pivotally mounted spring biased release pawl operatively associated with each of said locking pawls, said association being such as to permit relative bodily movement thereof in the directions of movement of said gear frame.

20. Apparatus as defined in claim 19 wherein each of said release pawls has an arm extending between adjacent gear assemblies, and comprising means on each number wheel assembly for engagement with a said arm to actuate one of said release pawls and thereby release a said stop.

21. Apparatus as defined in claim 20 wherein the release pawl actuated by a given number wheel assembly is operable to release the stop which controls the slide operatively associated with a number wheel assembly adjacent to said given number wheel assembly.

22. Apparatus as defined in claim 21 wherein each said release pawl has oppositely inclined surfaces engageable by a number wheel assembly whereby a said pawl is actuated each time the number wheel assembly associated therewith rotates through a predetermined position in either direction.

23. In a calculating machine, a slide rack assembly comprising first and second slides and means for connecting said slides together for limited linear longitudinal movement relative to each other, resilient means for yieldably connecting said slides and tending to hold the assembly in extended condition, said first slide having a longitudinally extending slot therein and a toothed extension at the forward end thereof for operative connection with totalizing means and said second slide having gear teeth on the rear upper edge thereof for operative connection with printing means, totalizing means operatively connected with said first slide, printing means operatively connected with said second slide, means for supporting and guiding said rack assembly for linear longitudinal movement, means for normally maintaining said slides in a predetermined position in contracted condition against the efforts of said resilient means, and means for locking said first slide against rearward movement from said predetermined position while releasing said second slide for rearward movement by said resilient means, the extent of said movement being determined by said connecting means.

24. In apparatus of the class described, a stationary frame, a plurality of slide racks mounted on said frame for linear longitudinal movement, each of said slide racks having two oppositely disposed sets of gear teeth thereon, means for selectively imparting reciprocating longitudinal movement to said slide racks, totalizing means including rotatable pinions continuously in mesh with said slide racks during each computing cycle, and means for moving said totalizing means to effect selective engagement of said pinions with one or the other of said sets of gear teeth on the racks.

25. In a calculating machine, a plurality of movable slide rack assemblies each comprising a pair of first and second slides, means for securing said pair of slides together for limited longitudinal movement relative to each other and resilient means connecting said pair of slides for yieldably urging said first slide forwardly and said second slide rearwardly relative to each other to the limited extent permitted by said securing means, means slidably supporting said assemblies for linear longitudinal movement, totalizing means, printing means, means operatively connecting said first slides to said totalizing means, means operatively connecting said second slides to said printing means, spring means under tension connected to each of said second slides for urging said assemblies rearwardly, actuating means for moving said assemblies forwardly simultaneously against the efforts of said spring means to a predetermined normal position in alignment with each other and with the slides of each assembly in contracted condition, and means for releasably locking each of said first slides against rearward movement from said normal position independently of said actuating means, said locking means comprising a pivoted pawl for each of said first slides and said supporting means including a rod having axially spaced grooves for receiving and guiding said first slides and said pawls.

26. In a calculating machine, a plurality of slide racks, means slidably supporting said slide racks for linear longitudinal movement, totalizing means, means operatively connecting said slide racks to said totalizing means, spring means under tension for urging each of said slide racks rearwardly, actuating means for moving said slide racks forwardly simultaneously against the efforts of said spring means to predetermined normal position in alignment with each other, means independent of said actuating means for releasably locking each of said slide racks against rearward movement from said normal position, said locking means comprising a pivoted pawl for each said slide rack, a transversely movable means for selectively controlling the rearward movement of said slide racks by said spring means when the same are released by said actuating means and said locking means, and resilient means biasing each said pawl toward locking position, each said pawl having a portion engageable with said transversely movable means to hold the pawl in nonlocking position when said transversely movable means is in the path of said portion.

References Cited in the file of this patent
UNITED STATES PATENTS

| | | |
|---|---|---|
| 1,195,567 | Draughon | Aug. 22, 1916 |
| 1,318,397 | Malcher | Oct. 14, 1919 |
| 1,371,138 | Bair | Mar. 8, 1921 |
| 1,593,799 | Kaddatz | July 27, 1926 |
| 1,854,177 | Buchter | Apr. 19, 1932 |
| 1,899,444 | Mehan | Feb. 28, 1933 |
| 1,965,611 | Sundstrand | July 19, 1934 |
| 2,034,345 | Kottmann | Mar. 17, 1936 |
| 2,303,692 | Hellgren | Dec. 1, 1942 |
| 2,366,345 | Machado | Jan. 2, 1945 |
| 2,628,780 | Goodbar et al. | Feb. 17, 1953 |
| 2,646,928 | Parker | July 28, 1953 |